US012811642B2

(12) United States Patent
Wang et al.

(10) Patent No.: US 12,811,642 B2
(45) Date of Patent: Nov. 24, 2026

(54) MULTI-USER-EQUIPMENT-COMMUNICATION TRANSMISSIONS USING ADAPTIVE PHASE-CHANGING DEVICES

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 383 days.

(21) Appl. No.: 18/550,241

(22) PCT Filed: Mar. 4, 2022

(86) PCT No.: PCT/US2022/070968
§ 371 (c)(1),
(2) Date: Sep. 12, 2023

(87) PCT Pub. No.: WO2022/213000
PCT Pub. Date: Oct. 6, 2022

(65) Prior Publication Data

US 2024/0171239 A1 May 23, 2024

Related U.S. Application Data

(60) Provisional application No. 63/169,096, filed on Mar. 31, 2021.

(51) Int. Cl.
*H04L 7/06* (2006.01)
*H04B 7/04* (2017.01)
(Continued)

(52) U.S. Cl.
CPC ....... *H04B 7/0617* (2013.01); *H04B 7/04013* (2023.05); *H04B 7/0452* (2013.01)

(58) Field of Classification Search
None
See application file for complete search history.

(56) References Cited

U.S. PATENT DOCUMENTS 10,476,577 B1 11/2019 Wang et al.
2019/0173561 A1* 6/2019 Wong ..................... H04B 7/088
(Continued)

FOREIGN PATENT DOCUMENTS

CN 110999119 A 4/2020
CN 111010219 4/2020
(Continued)

OTHER PUBLICATIONS

"Foreign Office Action", EP Application No. 22713232.1, Sep. 9, 2025, 7 pages.
(Continued)

*Primary Examiner* — Minh Trang T Nguyen
(74) *Attorney, Agent, or Firm* — Colby Nipper PLLC

(57) ABSTRACT

In aspects, a base station determines to transmit a multi-user-equipment communication, multi-UE communication, to multiple user equipments, UEs. The base station determines to include an adaptive phase-changing device, APD, in a communication path for a wireless signal carrying the multi-UE communication and selects a surface configuration for a surface of the APD based on determining to transmit the multi-UE communication. The base station directs the APD to apply the surface configuration to the surface and transmits the wireless signal carrying the multi-UE communication by transmitting the wireless signal towards the surface of the APD.

20 Claims, 8 Drawing Sheets

(51) Int. Cl.
*H04B 7/0452* (2017.01)
*H04B 7/06* (2006.01)

(56) References Cited

U.S. PATENT DOCUMENTS

| | | | | |
|---|---|---|---|---|
| 2022/0201654 | A1* | 6/2022 | Lee | H04L 5/0053 |
| 2023/0246674 | A1* | 8/2023 | Åström | H04B 7/145 375/262 |
| 2023/0308141 | A1* | 9/2023 | Wang | H04W 72/53 |

FOREIGN PATENT DOCUMENTS

| | | | |
|---|---|---|---|
| CN | 111093267 | | 5/2020 |
| CN | 111245492 | | 6/2020 |
| CN | 111245493 | A | 6/2020 |
| CN | 111246491 | | 6/2020 |
| CN | 111416646 | | 7/2020 |
| CN | 112532289 | | 3/2021 |
| WO | 2021221603 | | 11/2021 |
| WO | 2022213000 | | 10/2022 |

OTHER PUBLICATIONS

"International Preliminary Report on Patentability", Application No. PCT/US2022/070968, Jun. 9, 2023, 15 pages.
"International Search Report and Written Opinion", Application No. PCT/US2022/070968, Jun. 17, 2022, 11 pages.
"RIS Configuration, Beamformer Design, and Power Control in Single-Cell and Multi-Cell Wireless Networks", Mar. 20, 2021, 15 pages.
"Written Opinion", Application No. PCT/US2022/070968, Jan. 25, 2023, 8 pages.
Di, et al., "Hybrid Beamforming for Reconfigurable Intelligent Surface based Multi-user Communications: Achievable Rates with Limited Discrete Phase Shifts", Oct. 31, 2019, 30 pages.
Mu, Xidong, "Capacity and Optimal Resource Allocation for IRS-assisted Multi-user Communication Systems", Aug. 2, 2021, 32 pages.
Ning, et al., "Channel Estimation and Hybrid Beamforming for Reconfigurable Intelligent Surfaces Assisted THz Communications", Dec. 25, 2019, 16 pages.
Sarkar, et al., "Wireless Communications with Reconfigurable Intelligent Surfaces: Fundamentals, Experimentation, and Applications", Retrieved at: https://www.frontiersin.org/research-topics/16017/wireless-communications-with-reconfigurable-intelligent-surfaces-fundamentals-experimentation-and-ap#overview, Oct. 26, 2021, 6 pages.
Zhou, et al., "Intelligent Reflecting Surface Aided Multigroup Multicast MISO Communication System", Feb. 12, 2020, 16 pages.
"Foreign Office Action", CN Application No. 202280022157.7, Aug. 1, 2026, 20 pages.
Zhou, et al., "Intelligent Reflecting Surface Aided Multigroup Multicast MISO Communication Systems", May 13, 2020, 16 pages.

* cited by examiner

| Surface-Configuration Codebook 408 | | | | |
|---|---|---|---|---|
| *Index* | *Configuration for Element 402* | *Configuration for Element 404* | *Configuration for Element 406* | . . . |
| 0 | Phase Configuration 0 | Phase Configuration 1 | Phase Configuration 2 | . . . |
| 1 | Phase Configuration 3 | Phase Configuration 4 | Phase Configuration 5 | . . . |
| 2 | . . . | . . . | . . . | . . . |

MULTI-USER-EQUIPMENT-COMMUNICATION TRANSMISSIONS USING ADAPTIVE PHASE-CHANGING DEVICES

RELATED APPLICATION(S)

This application is a national stage entry of International Application No. PCT/US2022/070968, filed Mar. 4, 2022, which claims the benefit of U.S. Provisional Application No. 63/169,096, filed Mar. 31, 2021, the disclosures of which are incorporated herein by reference in their entirety.

BACKGROUND

Evolving wireless communication systems, such as fifth generation (5G) technologies and sixth generation (6G) technologies, use various techniques that increase data capacity relative to preceding wireless networks. As one example, 5G technologies transmit data using higher frequency ranges, such as a frequency band above 6 Gigahertz (GHz). As another example, 5G technologies support multiple-input, multiple-output (e.g., MU-MIMO, Massive MIMO) communications that use multiple transmission and/or reception paths.

While the higher frequency ranges for these evolving wireless communication systems can be used to increase data capacity, transmitting and recovering information using these higher frequency ranges also poses challenges. The higher-frequency signals and MIMO transmissions, for instance, are more susceptible to multipath fading and other types of path loss, which lead to recovery errors at a receiver. To illustrate, an urban environment includes multiple obstructions (e.g., buildings, foliage, vehicles) that may prevent and/or block higher frequency transmissions from reaching the intended receivers. It therefore becomes desirable to correct for the signal distortions in order to obtain sustainable performance benefits (e.g., increased data capacity) provided by these approaches.

SUMMARY

This document describes techniques and apparatuses for multi-user-equipment communication (multi-UE-communication) transmissions using adaptive phase-changing devices (APDs). In aspects, a base station determines to transmit a multi-user-equipment communication to multiple user equipments (UEs). The base station determines to include an APD in a communication path for a wireless signal carrying the multi-UE communication and selects a surface configuration for a surface of the APD based on determining to transmit the multi-UE communication. The base station directs the APD to apply the surface configuration to the surface and transmits the wireless signal carrying the multi-UE communication by transmitting the wireless signal towards the surface of the APD.

The details of one or more implementations for multi-UE-communication transmissions using APDs are set forth in the accompanying drawings and the following description. Other features and advantages will be apparent from the description, the drawings, and the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects for multi-UE-communication transmissions using APDs are described with reference to the following drawings. The same numbers are used throughout the drawings to reference like features and components.

DETAILED DESCRIPTION

Figure 1:
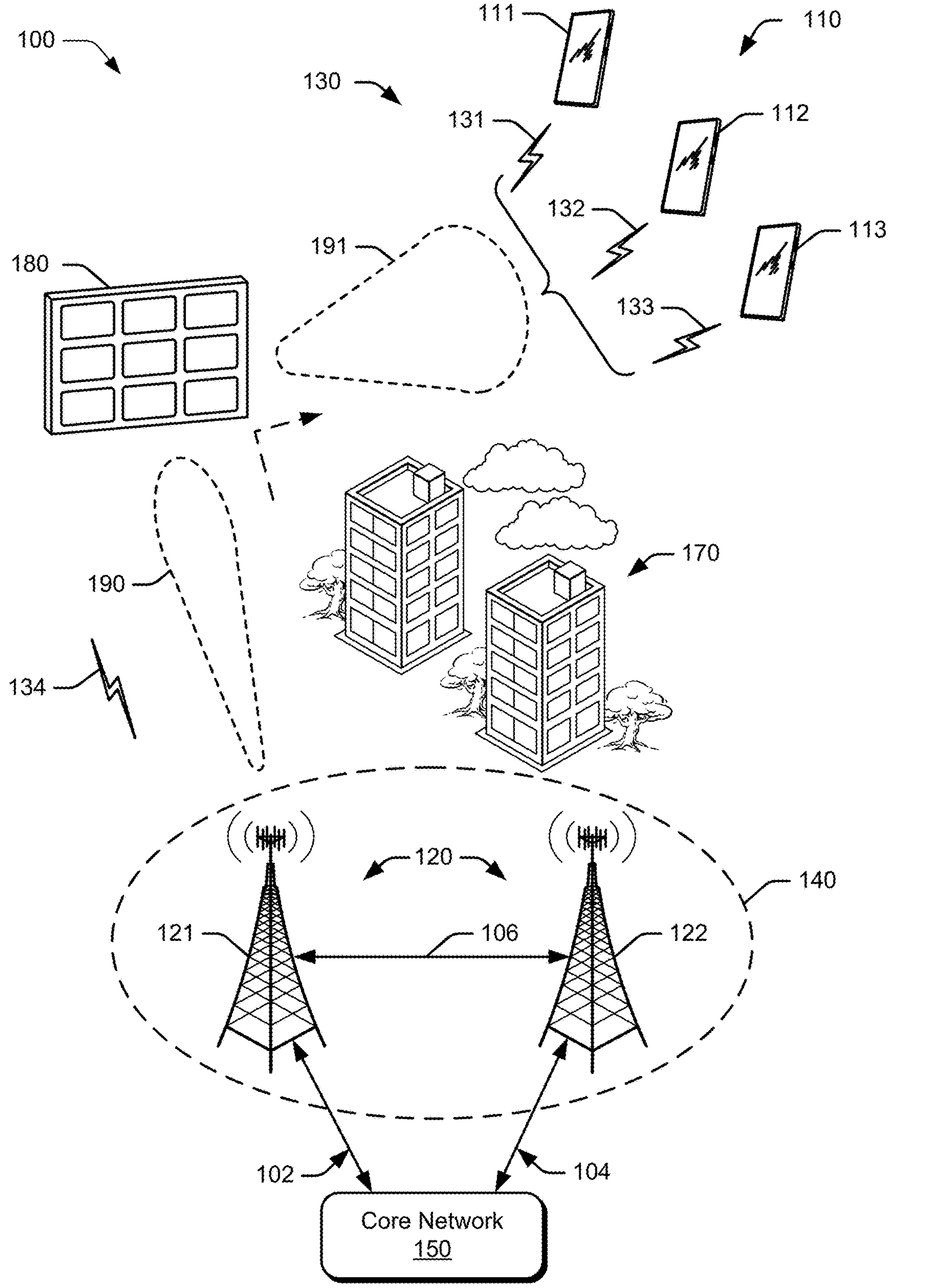
FIG. 1 illustrates an example operating environment that can be used to implement various aspects of multi-UE-communication transmissions using APDs.

Evolving wireless communication systems use various techniques to meet increasing usage demands. To illustrate, next-generation user devices implement applications that consume larger quantities of user data relative to preceding applications. To deliver these larger quantities of user data, evolving wireless communication systems (e.g., $5^{th}$ Generation (5G) systems, $6^{th}$ Generation (6G) systems) transmit at higher frequencies (e.g., millimeter wave (mmWave) range), sometimes with multiple-input, multiple-output (MIMO), such as multiple-user MIMO (MU-MIMO) and Massive MIMO, to increase data capacity. While higher frequencies and MIMO communications provide higher data throughput, channel conditions can negatively impact these techniques. As an example, mmWave signals have high throughput under Line of Sight (LoS) conditions, but reflections create multipath and frequency-selective fading that may increase recovery errors at the receiver. Various environments, such as dense urban areas, include multiple obstructions that further diminish signal quality and make the deployment of high-frequency communications in these environments more difficult. To illustrate, wireless communication systems broadcast and/or multicast information to multiple user equipments (UEs), such as system information blocks (SIBs), paging information, emergency alerts, multicast and broadcast services (MBS), and/or evolved multimedia broadcast multicast services (eMBMS). Reaching multiple UEs using high-frequency communications in dense urban areas becomes more challenging relative to low-frequency communications.

Adaptive phase-changing devices (APDs) include a Reconfigurable Intelligent Surface (RIS) that, when properly configured, modifies propagating signals to correct for, or reduce, errors introduced by communication path(s), such as small-scale fading and fading MIMO channels. Generally, an RIS includes configurable surface materials that shape how incident signals striking the surface of the materials are transformed and reflected. To illustrate, the configuration of the surface materials can affect the phase, amplitude, spatial coverage area, and/or polarization of the transformed signal. Thus, modifying a surface configuration of the RIS changes how incident signals are transformed when they reflect off the RIS.

In aspects, a base station configures the RIS of an APD to spatially widen an incident narrow-beam wireless signal (e.g., increase a horizontal and/or vertical span/width of a transmission coverage area) and direct the reflected beam towards a group of UEs, as further described with reference to FIGS. 5-8. Alternatively or additionally, the base station configures the RIS to maintain a spatial width (e.g., wide-beam to wide-beam, narrow-beam to narrow-beam) or to reduce the spatial width (e.g., wide-beam to narrow-beam). Generally, a beam width corresponds to the spatial width/span of a wireless transmission, such as a number of degrees the transmission spatially spans on a horizontal and/or vertical plane while propagating forward. In some aspects, the base station transmits a narrow beam that spans a first spatial width towards the configured RIS of the APD. The narrow beam strikes the configured RIS as an incident wireless signal, and the configured RIS transforms the reflected wireless signal as a wide beam that has a second, wider spatial width relative to the first spatial width. For instance, the first spatial width (and first signal strength) of the narrow beam spans a first region wide enough to cover (and reach) a single UE, but not multiple UEs nearby. The second spatial width of the reflected wide beam wireless signal, however, spans a second region wide enough to cover (and reach) multiple UEs in proximity, where the reflected wide beam wireless signal has a second, lower signal strength relative to the first signal strength. The beam width transformation allows the base station to transmit a narrow beam high-frequency wireless signal that carries broadcast and/or multicast information to multiple UEs and route the wireless signals around obstructions that might otherwise cause recovery errors at the multiple UEs. While this example describes a downlink narrow-beam wireless signal that the RIS of the APD transforms into a wide-beam wireless signal, the base station alternatively or additionally configures the RIS of the APD to transform uplink wireless signals in similar manners.

With respect to transmission power, multi-UE communications using APDs also allows transmitters (e.g., the base station) to transmit the broadcast and/or multicast information more efficiently relative to using ultra-wide beam transmissions (e.g., a third spatial width wider than a narrow-beam transmission and a wide-beam transmission) for the broadcast/multicast transmissions. To illustrate, to achieve a same receive power level for ultra-wide beam transmissions as a wide-beam transmission, a transmitter uses more power for the ultra-wide beam transmissions relative to the wide-beam transmissions. By using an APD to transform narrow-beam wireless signals into wide-beam wireless signals and transmitting to select regions (e.g., defined by groups of UEs), a base station can broadcast and/or multicast transmissions to multiple UEs using less transmission power (relative to ultra-wide beam transmissions). This also reduces signal interference generated by the broadcasts and/or multicast transmissions relative to ultra-wide beam and omnidirectional transmissions.

While features and concepts of the described systems and methods for multi-UE-communication transmissions using APDs can be implemented in any number of different environments, systems, devices, and/or various configurations, various aspects of multi-UE-communication transmissions using APDs are described in the context of the following example devices, systems, and configurations.

Example Environment

FIG. 1 illustrates an example environment 100, which includes multiple user equipments 110 (UE 110), illustrated as UE 111, UE 112, and UE 113. Each UE can communicate with one or more base stations 120 (illustrated as base stations 121 and 122) through one or more wireless communication links 130 (wireless link 130), illustrated as wireless links 131, 132, and 133. The wireless links also include a wireless link 134 that the base stations 120 use to communicate with an adaptive phase-changing device 180 (APD 180). In aspects, the base station 120 communicates with the APD 180 to control a surface configuration and/or position of the APD 180 at certain points in time. In other implementations, the base station 120 includes a wireline interface for communicating APD-control information (e.g., surface configuration, timing information, position information) to the APD 180. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device, such as a sensor, relay, or actuator. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, distributed base stations, or the like, or any combination thereof.

One or more base stations 120 communicate with the UE 110 using the wireless links 131, 132, and 133, which may be implemented as any suitable type of wireless link. In one example, the base station 120 broadcasts and/or multicasts information to the UEs 110 using the wireless links 130 and at least one APD to route and/or transform wireless signals. In another example, the base station 120 unicasts information to each respective UE using at least one APD to route and/or transform the wireless signals. In some aspects, the base station 120 configures the surface of the APD to spatially modify an incident wave (e.g., increase/decrease a beam width) as further described with reference to FIG. 5 and FIG. 6. The wireless links 131, 132, and 133 include control-plane information and/or user-plane data, such as downlink user-plane data and control-plane information communicated from the base stations 120 to the UEs 110, uplink of other user-plane data and control-plane information communicated from the UEs 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), fifth-generation New Radio (5G NR), sixth-generation (6G), and so forth. As one example, the multiple wireless links can include a first sub-6 Gigahertz (GHz) anchor link and a second, above 6 GHz link. Multiple wireless links 130 may be aggregated using a carrier aggregation or multi-connectivity technology to provide a higher data rate for the UE 110. Multiple wireless links 130 from multiple base stations 120 may be configured for Coordinated Multipoint (CoMP) communication with the UE 110.

In some implementations, the wireless links 130 utilize wireless signals that one or more intermediate devices (e.g., APD 180) reflect or transform, such as reflections that route the wireless signals around obstructions 170 that block line-of-sight (LoS) transmissions between the base station 120 and the UEs 110. The obstructions can range from a more-temporary obstruction such as water vapor (shown) or a moving vehicle, to a seasonal obstruction such as deciduous trees (shown), to a more-permanent obstruction such as a building (shown). In aspects, the intermediate device(s) (e.g., the APD 180) alternatively or additionally spatially modify an incident wireless signal.

In the environment 100, a narrow-beam wireless signal 190 implements any combination of the wireless links 131, 132, and/or 133. The narrow-beam wireless signal 190 may correspond to broadcast, multicast, and/or multiple unicast transmissions. As part of broadcasting and/or multicasting control-plane information and/or user-plane data with the UE 110 through the wireless links 131, 132, and 133, the base station 121 transmits a downlink wireless signal towards the surface of the APD 180. Portions (e.g., signal rays) or all of the narrow-beam wireless signal 190 strike the surface of the APD 180 and transform into a wide-beam wireless signal 191 as further described with reference to FIG. 5.

In aspects, the base station 120 configures an RIS of the APD 180 to direct how the RIS alters signal properties (e.g., direction, phase, spatial width, amplitude, polarization) of a wireless signal. In the environment 100, the base station 120 communicates respective RIS surface-configuration information to the APD 180 using the wireless link 134. The wireless link 134 may correspond to an APD-control channel used by the base station 120 to communicate APD-control information to the APD 180, such as an adaptive phase-changing device slow-control channel (APD-slow-control channel) for communicating large quantities of control data (e.g., codebooks) and/or using an adaptive phase-changing device fast-control channel (APD-fast-control channel) for quickly communicating time-sensitive control information (e.g., apply a surface configuration at the start of the next time slot).

The base station 120 determines surface configuration(s) for the APD 180 that direct or steer reflections of wireless signals between the base station 120 and multiple UEs (e.g., the UE 111, the UE 112, the UE 113). Alternatively or additionally, the base station 120 determines and/or selects surface configurations that change a spatial width of an incident wireless signal (e.g., transform a narrow-beam wireless signal to a wide-beam wireless signal, transform a wide-beam wireless signal to a narrow-beam wireless signal) as further described. This includes multi-UE-communication surface configurations (e.g., a surface configuration for broadcasting and/or multicasting transmissions to multiple UEs) and/or unicast surface configurations (e.g., a surface configuration for unicast transmissions with a single UE). In aspects, the base station 120 determines surface configuration(s) for the APD 180 based on UE location information, downlink signal-quality measurements/parameters received from one or more of the UE 111, the UE 112, and/or the UE 113, uplink signal-quality measurements/parameters generated by the base station 120, and/or historical records regarding previous successful and unsuccessful broadcast and/or multicast downlink wireless communications, where the historical records include information such as APD locations, UE locations, downlink/uplink (DL/UL) signal strength/quality measurement reports, APD surface configurations (e.g., codebook indices), APD surface configuration codebooks, and so forth.

The base stations 120 collectively form at least part of a Radio Access Network 140 (RAN 140) (e.g., RAN, Evolved Universal Terrestrial Radio Access Network, E-UTRAN, 5G NR RAN or NR RAN). The base stations 121 and 122 connect, at 102 and 104 respectively, to a core network 150 through an NG2 interface for control-plane signaling and an NG3 interface for user-plane data communications when connecting to a 5G core network or using an S1 interface for control-plane signaling and user-plane data communications when connecting to an Evolved Packet Core (EPC) network. The UE 110 may connect, via the RAN 140 and core network 150, to public networks (e.g., the Internet) to interact with a remote service (not illustrated in FIG. 1).

The base stations 121 and 122 can communicate using an Xn Application Protocol (XnAP) through an Xn interface or using an X2 Application Protocol (X2AP) through an X2 interface, at 106, to exchange user-plane and control-plane data. Alternatively or additionally, the base stations 121 and 122 communicate with one another using a wireless integrated access backhaul (IAB) link (not illustrated in FIG. 1), where one of the base stations acts as a donor base station and the other base station acts as a node base station.

Example Devices

Figure 2:
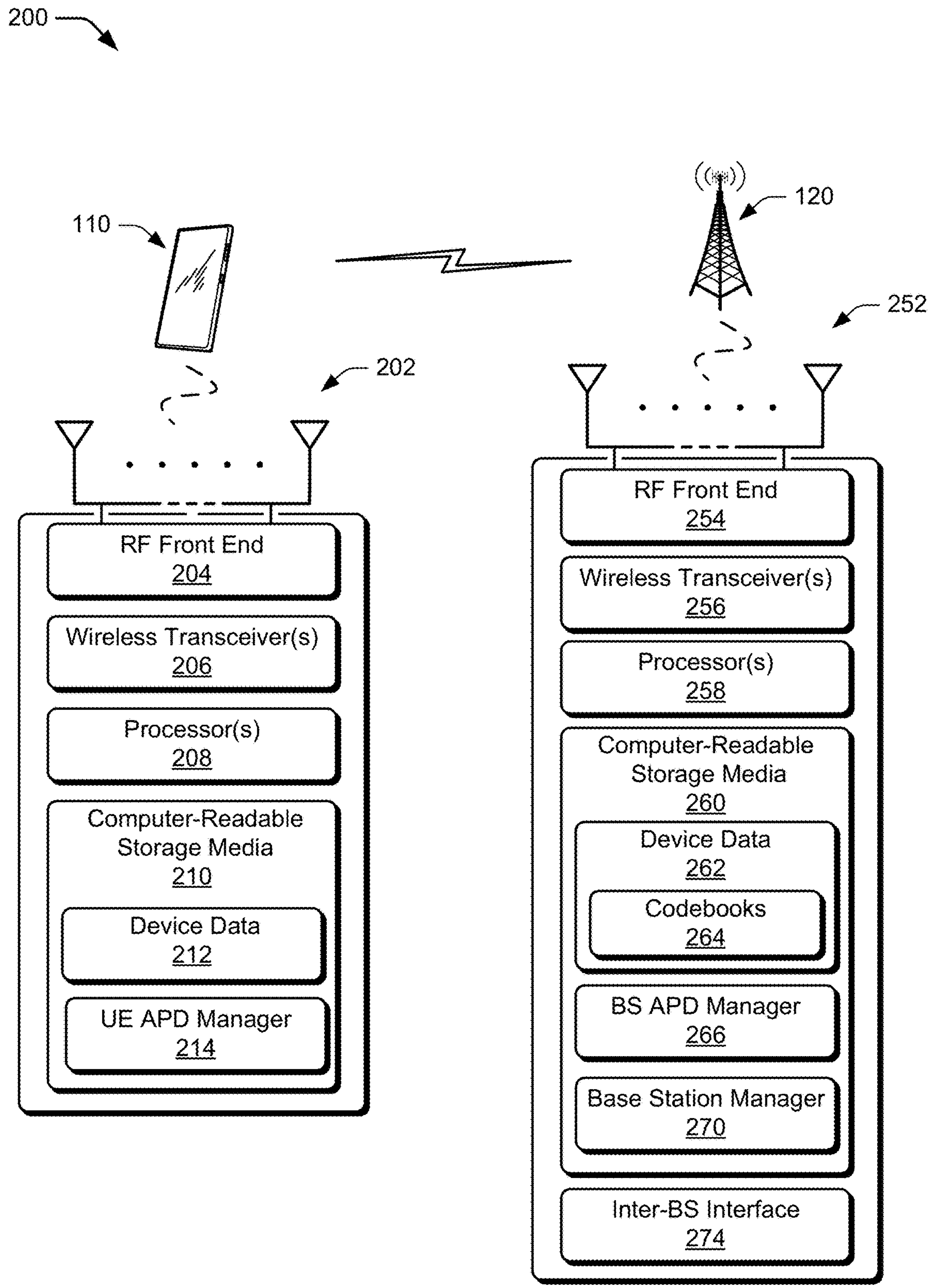
FIG. 2 illustrates an example device diagram of entities that can implement various aspects of multi-UE-communication transmissions using APDs.

FIG. 2 illustrates an example device diagram 200 of the UE 110 and base station 120. Generally, the device diagram 200 describes network entities that can implement various aspects of multi-UE-communication transmissions using APDs. FIG. 2 shows respective instances of the UE 110 and the base station 120. The UE 110 or the base station 120 may include additional functions and interfaces that are omitted from FIG. 2 for the sake of visual brevity. The UE 110 includes antennas 202, a radio-frequency front end 204 (RF front end 204), and one or more wireless transceivers 206 (e.g., radio-frequency transceivers), such as any combination of an LTE transceiver, a 5G NR transceiver, and/or a 6G transceiver for communicating with the base station 120 in the RAN 140. The RF front end 204 of the UE 110 can couple or connect the wireless transceivers 206 to the antennas 202 to facilitate various types of wireless communication.

The antennas 202 of the UE 110 may include an array of multiple antennas that are configured in a manner similar to or different from each other. The antennas 202 and the RF front end 204 can be tuned to, and/or be tunable to, one or more frequency bands defined by communication standards (e.g., 3GPP LTE, 5G NR and/or 6G) and implemented by the wireless transceiver(s) 206. Additionally, the antennas 202, the RF front end 204, and/or the wireless transceiver(s) 206 may be configured to support beam-sweeping for the transmission and reception of communications with the base stations 120. By way of example and not limitation, the antennas 202 and the RF front end 204 can be implemented for operation in sub-gigahertz bands, sub-6 GHz bands, and/or above-6 GHz bands that are defined by the 3GPP LTE and 5G NR communication standards (e.g., 57-64 GHz, 28 GHz, 38 GHz, 71 GHz, 81 GHz, or 92 GHz bands).

The UE 110 also includes processor(s) 208 and computer-readable storage media 210 (CRM 210). The processor 208 may be a single-core processor or a multiple-core processor implemented with a homogenous or heterogeneous core structure. The computer-readable storage media described herein excludes propagating signals. CRM 210 may include any suitable memory or storage device, such as random-access memory (RAM), static RAM (SRAM), dynamic RAM (DRAM), non-volatile RAM (NVRAM), read-only memory (ROM), or Flash memory useable to store device data 212 of the UE 110. The device data 212 includes any combination of user data, multimedia data, applications, and/or an operating system of the UE 110. In implementations, the device data 212 stores processor-executable instructions that are executable by the processor(s) 208 to enable user-plane communication, control-plane signaling, and user interaction with the UE 110.

The CRM 216 of the UE 110 may optionally include a user equipment adaptive phase-changing device manager 214 (UE APD manager 214). Alternatively or additionally, the UE APD manager 214 may be implemented in whole or part as hardware logic or circuitry integrated with or separately from other components of the UE 110. In aspects, the UE APD manager 214 receives APD-access information for using a surface of an APD, such as reflection-access information that indicates time information on when to use the APD surface, configurable surface element information that indicates portions of the APD surface available to the UE 110, and/or transmission-direction information (e.g., beam-direction information for transmissions from the UE). The UE APD manager 214 directs the UE 110 to transmit communications with the base station 120 by using a surface of the APD and based on the APD-access information. In some implementations, the use of APDs in the communication path can be invisible to the UE, and the UE 110 need not include a UE APD manager 214 in such implementations.

The device diagram for the base station 120, shown in FIG. 2, includes a single network node (e.g., a gNode B). The functionality of the base station 120 may be distributed across multiple network nodes or devices and may be distributed in any fashion suitable to perform the functions described herein. The nomenclature for this distributed base station functionality varies and includes terms such as Central Unit (CU), Distributed Unit (DU), Baseband Unit (BBU), Remote Radio Head (RRH), Radio Unit (RU), and/or Remote Radio Unit (RRU). The base station 120 includes antennas 252, a radio-frequency front end 254 (RF front end 254), one or more wireless transceiver(s) 256 (e.g., radio-frequency transceivers) for communicating with the UE 110, such as LTE transceivers, 5G NR transceivers, and/or 6G transceivers. The RF front end 254 of the base station 120 can couple or connect the wireless transceivers 256 to the antennas 252 to facilitate various types of wireless communication. The antennas 252 of the base station 120 may include an array of multiple antennas that are configured in a manner similar to or different from each other. The antennas 252 and the RF front end 254 can be tuned to, and/or be tunable to, one or more frequency bands defined by communication standards (e.g., 3GPP LTE, 5GNR, and/or 6G) and implemented by the wireless transceivers 256. Additionally, the antennas 252, the RF front end 254, and/or the wireless transceivers 256 may be configured to support beamforming, such as Massive-MIMO, for the transmission and reception of communications with the UE 110 and/or another base station 120.

The base station 120 also includes processor(s) 258 and computer-readable storage media 260 (CRM 260). The processor 258 may be a single-core processor or a multiple-core processor composed of a variety of materials, such as silicon, polysilicon, high-K dielectric, copper, and so on. CRM 260 may include any suitable memory or storage device, such as RAM, SRAM, DRAM, NVRAM, ROM, or Flash memory useable to store device data 262 of the base stations 120. The device data 262 includes network-scheduling data, radio resource-management data, applications, and/or an operating system of the base station 120, which are executable by processor(s) 258 to enable communication with the UE 110. The device data 262 also includes codebooks 264. The codebooks 264 may include any suitable type or combination of codebooks, including surface-configuration codebooks that store surface-configuration information for an RIS of an APD and beam-sweeping codebooks that store patterns, sequences, APD-position information, and/or timing information for implementing multiple surface-configurations useful to direct an APD to perform a variety of reflective beamforming. In some aspects, the surface-configuration codebooks and beam-sweeping codebooks include phase-vector information, angular information (e.g., calibrated to respective phase vectors), and/or beam-configuration information.

In aspects, the CRM 260 of the base station 120 also includes a base station adaptive phase-changing device manager 266 (BS APD manager 266) for managing APD usage in communication path(s) with the UE 110. Alternatively or additionally, the BS APD manager 266 may be implemented in whole or part as hardware logic or circuitry integrated with or separately from other components of the base station 120. In aspects, the BS APD manager 266 selects and/or groups UEs for multi-UE communications that utilize an APD, as further described. As one example, the BS APD manager 266 selects the UEs to include in a group transmission based on respective locations of the UEs. The BS APD manager 266 also determines surface configurations for the APD (e.g., RIS configurations), such as multi-UE-communication surface configurations and/or unicast surface configurations based on link-quality measurements, measurement reports, and/or other values as further described. In some aspects, the BS APD manager 266 selects a multi-UE-communication surface configuration based on one or more unicast surface configurations. With respect to multi-UE-communication surface configurations, the BS APD manager 266 sometimes determines a surface configuration that transforms an incident narrow-beam wireless signal into a reflected wide-beam wireless signal and/or a beam-sweeping pattern that sweeps the reflected wide-beam wireless signal to different spatial regions based on time information. Alternatively or additionally, the BS APD manager 266 schedules shared air interface resources to multiple unicast transmissions for groups of UEs, such as a same time slot with adjacent air interface resources (e.g., resource blocks, resource elements, frequency allocations). In some aspects, the BS APD manager 266 schedules UE-specific signals in a Physical Downlink Shared Channel (PDSCH) based on multi-UE communications and multi-UE-communication surface configurations as further described.

The CRM 260 also includes a base station manager 270 for managing various functionalities and communication interfaces of the base stations 120. Alternatively or additionally, the base station manager 270 may be implemented in whole or in part as hardware logic or circuitry integrated with or separately from other components of the base stations 120. In at least some aspects, the base station manager 270 configures the antennas 252, RF front end 254, and wireless transceivers 256 for communication with the UE 110 (e.g., the wireless link 131, the wireless link 132, the wireless link 133) and/or the APD 180 (e.g., the wireless link 134). The base station 120 sometimes includes a core network interface (not shown) that the base station manager 270 configures to exchange user-plane data and control-plane information with core network functions and/or entities.

Figure 3:
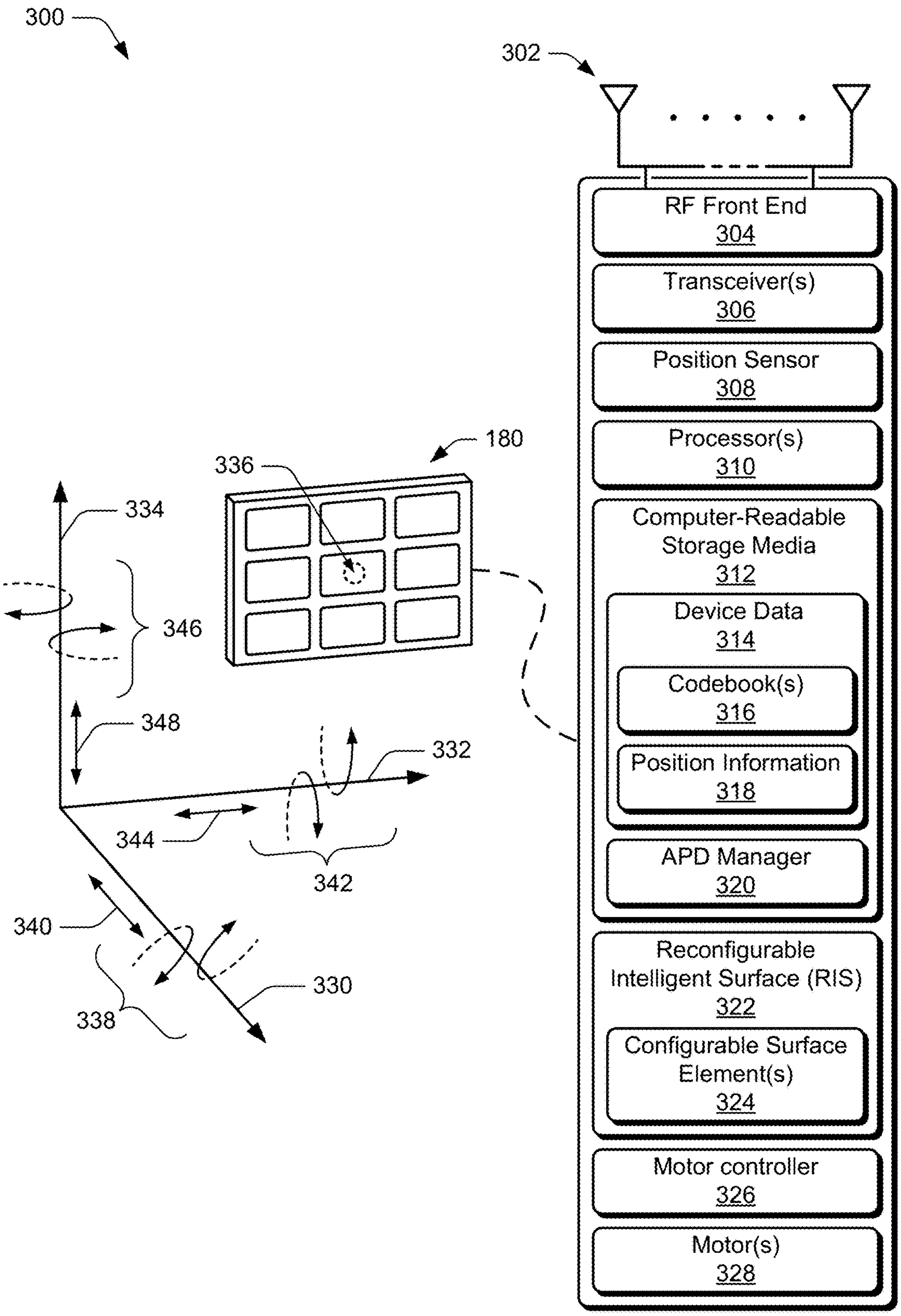
FIG. 3 illustrates an example device diagram of an adaptive phase-changing device that can be used in accordance with one or more aspects of multi-UE-communication transmissions using APDs.

FIG. 3 illustrates an example device diagram 300 of the APD 180. Generally, the device diagram 300 describes an example entity with which various aspects of multi-UE-communication transmissions using APDs can be implemented but may include additional functions and interfaces that are omitted from FIG. 3 for the sake of visual clarity. The adaptive phase-changing device (APD) 180 is an apparatus that includes a Reconfigurable Intelligent Surface (RIS) 322, and components for controlling the RIS 322 (e.g., by applying a surface configuration of the RIS), as further described below. In some implementations, the APD 180 may also include components for modifying the position of the APD 180 itself, which in turn modifies the position of the RIS 322. The APD 180 includes one or more antenna(s) 302, a radio frequency front end 304 (RF front end 304), and one or more radio-frequency transceivers 306 for wirelessly communicating with the base station 120 and/or the UE 110. The APD 180 can also include a position sensor 308, such as a Global Navigation Satellite System (GNSS) module, that provides position information based on a location of the APD 180.

The antenna(s) 302 of the APD 180 may include an array of multiple antennas that are configured in a manner similar to or different from each other. Additionally, the antennas 302, the RF front end 304, and the transceiver(s) 306 may be configured to support beamforming for the transmission and reception of communications with the base stations 120. By way of example and not limitation, the antennas 302 and the RF front end 304 can be implemented for operation in sub-gigahertz bands, sub-6 GHz bands, and/or above 6 GHz bands. Thus, the antenna 302, the RF front end 304, and the transceiver(s) 306 provide the APD 180 with an ability to receive and/or transmit communications with the base station 120, such as information transmitted using the wireless link 134.

The APD 180 includes processor(s) 310 and computer-readable storage media 312 (CRM 312). The processor 310 may be a single-core processor or a multiple-core processor implemented with a homogenous or heterogeneous core-structure. The computer-readable storage media described herein excludes propagating signals. CRM 312 may include any suitable memory or storage device such as RAM, SRAM, DRAM, NVRAM, ROM, or Flash memory useable to store device data 314 of the APD 180. The device data 314 includes user data, multimedia data, applications, and/or an operating system of the APD 180, which are executable by processor(s) 310 to enable dynamic configuration of the APD 180 as further described. The device data 314 also includes one or more codebooks 316 of any suitable type or combination and position information 318 of the APD 180. The position information 318 may be obtained or configured using the position sensor 308 or programmed into the APD 180, such as during installation. The position information 318 indicates a position of the APD 180 and may include a location, geographic coordinates, orientation, elevation information, or the like. A base station 120, by way of a BS APD manager 266, can use the position information 318 in computing angular or distance information, such as between the base station 120 and APD 180 and/or between the APD 180 and a group of UEs (e.g., the UE 111, the UE 112, the UE 113). The codebooks 316 can include surface-configuration codebooks that store surface-configuration information for an RIS of an APD and beam-sweeping codebooks that store patterns, sequences, or timing information (e.g., phase vectors and reflection identifiers) for implementing multiple surface-configurations useful to direct an APD to perform a variety of reflective beamforming. In some aspects, the surface-configuration codebooks and beam-sweeping codebooks include phase-vector information, angular information (e.g., calibrated to respective phase vectors), and/or beam-configuration information.

In aspects of multi-UE-communication transmissions using APDs, the CRM 312 of the APD 180 includes an adaptive phase-changing device manager 320 (APD manager 320). Alternatively or additionally, the APD manager 320 may be implemented in whole or part as hardware logic or circuitry integrated with or separately from other components of the APD 180. Generally, the APD manager 320 manages a surface configuration of the APD 180, such as by processing information exchanged with a base station over wireless link(s) 133 and/or 134 and using the information to configure a reconfigurable intelligent surface 322 (RIS 322) of the APD 180. To illustrate, the APD manager 320 receives an indication of a surface configuration over the wireless link 134 (an APD control channel), extracts the surface configuration from the codebooks 316 using the indication, and applies the surface configuration to the RIS 322. Alternatively or additionally, the APD manager 320 initiates the transmission of uplink messages to the base station over the wireless link 134, such as acknowledgments/negative acknowledgments (ACKs/NACKs) for various APD configuration or management commands. In some aspects, the APD manager 320 receives an indication of a beam-sweeping pattern (e.g., beam-sweeping pattern index) over the wireless link 134 and applies a sequence of various surface configurations to the RIS based on the beam-sweeping pattern and/or in accordance with a synchronization or pattern timing indicated by or received with the indication.

The RIS 322 of the APD 180 includes one or more configurable surface element(s) 324, such as configurable electromagnetic elements, configurable resonator elements, or configurable reflectarray antenna elements. Generally, the configurable surface elements 324 can be selectively or programmatically configured to control how the RIS 322 reflects (e.g., directionality) and/or transforms incident waveforms. By way of example and not of limitation, configurable electromagnetic elements include scattering particles that are connected electronically (e.g., through PIN diodes). Implementations use the electronic connection to arrange the scattering particles, such as based on principles of reflection, to control a directionality, phase, amplitude, and/or polarization of the transformed waveform (from the incident waveform). The RIS 322 can include array(s) of configurable surface element(s) 324, where an array can include any number of elements having any size.

In some aspects, a position and/or orientation of the APD 180 is configurable, and the APD 180 includes a motor controller 326 communicating with one or more motor(s) 328 that are operably coupled with a physical chassis of the APD 180. Based on command and control information, such as received from a base station 120, the motor controller 326 can send commands to the motors 328 that alter one or more kinematic behaviors of the motors 328, which may include any suitable type of stepper motor or servo. For example, the motor controller 326 may issue commands or control signals that specify a shaft rotation of a stepper motor in degrees, a shaft-rotation rate of a stepper motor in revolutions per minute (RPM), a linear movement of a linear motor in millimeters (mm), a linear velocity of a linear motor in meters/second (m/s). The one or more motors 328, in turn, may be linked to mechanisms that mechanically position the physical chassis or a platform (e.g., avionics of a drone, a drive of a linear rail system, a gimble within a base station, a linear bearing within a base station) supporting the APD 180. Through the commands and signals that the motor controller 326 generates and sends to the motors 328, a physical position, location, or orientation of the APD 180 (and/or the platform supporting the APD 180) may be altered. In response to receiving a position configuration from a base station, the APD manager 320 communicates movement commands to the motor controller 326, such as through a software interface and/or hardware addresses, based on the position configuration. In aspects of multi-UE-communication transmissions using APDs, a base station 120 may reposition or reorient one or more APDs 180 to improve or enable wireless signal reflections to be directed to the UE 110.

Generally, the APD 180 can include multiple motors, where each motor corresponds to a different rotational or linear direction of movement. Examples of motor(s) 328 that can be used to control orientation and location of the APD include linear servo motors that might be part of a (i) rail system mounting for the APD, (ii) motors controlling a direction and pitch, yaw, roll of a drone carrying the APD, (iii) radial servo or stepper motors that rotate an axis if the APD is in a fixed position or on a gimbal, and so on. For clarity, the motor controller 326 and the motors 328 are illustrated as being a part of the APD 180, but in alternative or additional implementations, the APD 180 communicates with motor controllers and/or motors external to the APD. To illustrate, the APD manager 320 communicates a position configuration to a motor controller that mechanically positions a platform or chassis that supports the APD 180. In aspects, the APD manager 320 communicates the position configuration to the motor controller using a local wireless link, such as Bluetooth®, Zigbee™, IEEE 802.15.4, or a hardwire link. The motor controller then adjusts the platform based on the position configuration using one or more motors. The platform can correspond to, or be attached to, any suitable mechanism that supports rotational and/or linear adjustments, such as a drone, a rail-propulsion system, a hydraulic lift system, and so forth.

As shown in FIG. 3, a position of the APD 180 may be defined with respect to a three-dimensional coordinate system in which an X-axis 330, Y-axis 332, and Z-axis 334 define a spatial area and provide a framework for indicating a position configuration through rotational and/or linear adjustments. While these axes are generally labeled as the X-axis, Y-axis, and Z-axis, other frameworks can be utilized to indicate the position configuration. To illustrate, aeronautical frameworks reference the axes as vertical (yaw), lateral (pitch), and longitudinal (roll) axes, while other movement frameworks reference the axes as vertical, sagittal, and frontal axes. As one example, position 336 generally points to a center position of the APD 180 that corresponds to a baseline position (e.g., position (0,0,0) using XYZ coordinates).

In aspects, the APD manager 320 communicates a rotational adjustment (e.g., rotational adjustments 338) around the X-axis 330 to the motor controller 326, where the rotational adjustment includes a rotational direction (e.g., clockwise or counterclockwise), an amount of rotation (e.g., degrees), and/or a rotation velocity. Alternatively or additionally, the APD manager 320 communicates a linear adjustment 340 along the X-axis, where the linear adjustment includes any combination of a direction, a velocity, and/or a distance of the adjustment. At times, the APD manager 320 communicates adjustments around the other axes as well, such as any combination of rotational adjustments 342 around the Y-axis 332, linear adjustments 344 along the Y-axis 332, rotational adjustments 346 around the Z-axis 334, and/or linear adjustments 348 along the Z-axis 334. Thus, the position configuration can include combinations of rotational and/or linear adjustments in all three degrees of spatial freedom. This allows the APD manager 320 to communicate physical adjustments to the APD 180. Alternatively or additionally, the APD manager communicates RIS surface configurations as further described.

Controlling Adaptive Phase-Changing Devices

Figure 4:
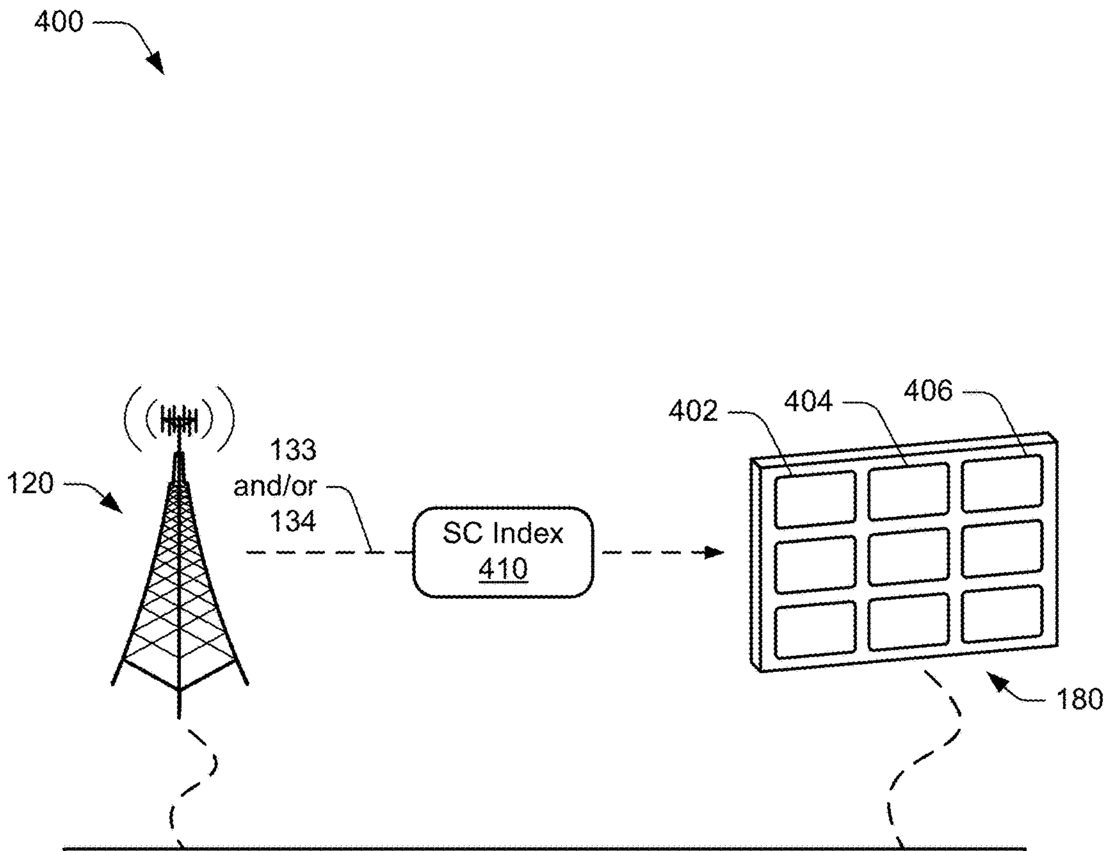
FIG. 4 illustrates an example environment in which a base station configures an adaptive phase-changing device in accordance with various aspects of multi-UE-communication transmissions using APDs.

FIG. 4 illustrates an example 400 of configuring an APD 180 in accordance with one or more aspects of multi-UE-communication transmissions using APDs. The example 400 includes instances of a base station 120 and an APD 180, which may be implemented similarly as described with reference to FIGS. 1-3 and 5-8. The RIS implemented by the APD 180 includes an array of "N" configurable surface elements, such as configurable surface element 402, configurable surface element 404, configurable surface element 406, and so forth, where "N" represents the number of configurable surface elements of the RIS. For visual brevity, the example 400 shows the base station 120 configuring a single APD 180, but the base station 120 may configure additional APDs (not illustrated in FIG. 4) for multi-UE-communication transmissions using APDs.

In some aspects of multi-UE-communication transmissions using APDs, the base station 120 determines to include an APD in a communication path for broadcast, multicast, and/or multiple-unicast transmissions to multiple UEs. For instance, based on unicast transmissions as described with reference to FIG. 5, the base station 120 identifies that some unicast connections include an APD in a respective communication path. Alternatively or additionally, the base station 120 determines that one or more link quality parameters (e.g., uplink quality parameters, downlink quality parameters) have fallen below an acceptable performance threshold and/or level. By way of example and not of limitation, various link-quality measurements that do not meet an acceptable performance level can indicate channel impairments, such as a delay spread between a first received signal and a last received signal (e.g., received multipath rays) exceeding an acceptable delay-spread threshold, an average time-delay (of the multipath rays) exceeding an acceptable average time-delay threshold, or a reference signal receive power (RSRP) falling below an acceptable power-level threshold. Alternative or additional measurements may be monitored, such as a received signal strength indicator (RSSI), power information, signal-to-interference-plus-noise ratio (SINR) information, channel quality indicator (CQI) information, channel state information (CSI), Doppler feedback, BLock Error Rate (BLER), Quality of Service (QoS), Hybrid Automatic Repeat reQuest (HARQ) information (e.g., first transmission error rate, second transmission error rate, maximum retransmissions), uplink SINR, timing measurements, error metrics, and so on.

In aspects, the base station determines to utilize APD(s) in a communication path between the base station and the group of UEs based on an estimated UE-location (e.g., for a single UE) or center-of-area and/or geometric-center UE-location (e.g., for a group of UEs). For example, the base station identifies that a UE has moved to a location with a history of channel impairment(s), such as by analyzing historical records with signal measurements and/or link quality parameters from the same or other UEs at the estimated UE-location. As another example, the base station generates the center-of-area UE-location for a group of UEs and determines, based on analyzing historical records, that the group of UEs operates in a general location (e.g., the average UE-location) where base stations historically include an APD in the communication path.

In response to determining to include an APD in a communication path, the base station 120 selects a surface configuration for the RIS of the APD 180 that transforms wireless signals (used to implement a wireless link) to mitigate the channel impairments and improve a received signal quality. Alternatively or additionally, the base station 120 selects a surface configuration that spatially modifies an incident wireless signal (e.g., widens or narrows a beam width of the reflected wireless signal). This can include the base station 120 selecting a surface configuration for unicast transmissions with a particular UE and/or selecting a surface configuration for multi-UE-communication transmissions with one or more groups of UEs. As one example, the base station 120 selects a first surface configuration for unicast transmissions with a particular UE and then uses the first surface configuration to select a second configuration for multi-UE-communications with a group of UEs that includes the particular UE. To illustrate, the base station 120 identifies a first reflection angle of the APD surface when configured with the first (unicast) surface configuration and selects the second (multi-UE-communication) surface configuration to configure the APD surface with a second, commensurate (e.g., within a threshold value) reflection angle. Alternatively, the base station 120 deactivates one or more (particular) configurable surface elements used by a preceding surface configuration (e.g., the first surface configuration), such as by turning off every other surface configuration element in a row or column and/or turning off one or more perimeter configurable elements in the row and/or column). As another example, the base station uses the first surface configuration to select a beam-sweeping pattern that sweeps a spatial region (e.g., selects a beam-sweeping pattern that includes the first surface configuration).

In implementations, the base station 120 manages a configuration of the RIS of the APD 180 through use of a surface-configuration codebook 408, which can be preconfigured and/or known by both the base station 120 and the APD 180. The base station 120 and the APD 180 may maintain multiple surface-configuration codebooks, such as multiple surface-configuration codebooks that correspond to a respective (different) location of a (movable) APD. To illustrate, the base station 120 analyzes the surface-configuration codebook, which may be based on a current APD-location, to identify a surface configuration that modifies and/or transforms various signal characteristics of a wireless signal, such as modifying one or more desired phase characteristic(s), one or more amplitude characteristic(s), a polarization characteristic, a beam width characteristic, and so forth. Thus, the base station 120 may first select a surface-configuration codebook based on a current APD location, then identify a surface configuration in the selected surface-configuration codebook.

In some implementations, the base station 120 uses historical records to select a surface configuration. For instance, the base station uses an estimated and/or average UE-location to retrieve surface configurations from historical records that link geographic locations (e.g., latitude, longitude, altitude) to surface configurations that improve signal quality at the location. This can include the base station 120 using the historical records to select a surface configuration for multi-UE-communication transmissions.

In some cases, the base station 120 transmits a surface-configuration codebook 408 and/or a beam-sweeping codebook using the wireless link 134 with the APD, such as by using and any combination of physical layer (layer-1) signaling, Medium Access Control (MAC) layer (layer-2) signaling, and/or Radio Link Control (RLC) layer (layer-3) messaging. In aspects, the base station 120 uses an APD-slow-control channel to communicate large quantities of data, to communicate data without low-latency requirements, and/or to communicate data without timing requirements. At times, the base station 120 transmits multiple surface-configuration codebooks (e.g., codebooks 264) to the APD 180, such as a first surface-configuration codebook for downlink communications, a second surface-configuration codebook for uplink communications, a phase-vector codebook, a beam-sweeping codebook, or the like. In response, the APD 180 stores the surface-configuration codebook(s) 408 and/or other codebooks in CRM, which is representative of codebook(s) 316 in CRM 312 as described with reference to FIG. 3. Alternatively or additionally, the APD 180 obtains the surface-configuration and other codebooks through manufacturing (e.g., programming), calibration, or installation processes that store the surface-configuration codebook(s) 408 and other codebooks in the CRM 312 of the APD 180 during assembly, installation, calibration, verification, or through an operator manually adding or updating the codebook(s).

The surface-configuration codebook 408 includes configuration information that specifies a surface configuration for some or all of the configurable surface elements (e.g., elements 324) forming the RIS of the APD 180. Alternatively or additionally, the surface-configuration codebook 408 includes APD positioning information (e.g., azimuth and/or elevation positions for the APD/APD surface). As one example, each index of the codebook corresponds to a phase vector with configuration information for each configurable surface element of the APD 180 and/or an APD position. Index 0, for instance, maps phase configuration 0 to configurable surface element 402, phase configuration 1 to configurable surface element 404, phase configuration 2 to configurable surface element 406, and so forth. Similarly, index 1 maps phase configuration 3 to configurable surface element 402, phase configuration 4 to configurable surface element 404, phase configuration 5 to configurable surface element 406, and so forth. The surface-configuration codebook 408 can include any number of phase vectors that specify configurations for any number of configurable surface elements, such that a first phase-vector corresponds to a first surface-configuration for the APD 180 (by way of configurations for each configurable surface element in the RIS), a second phase-vector corresponds to a second surface-configuration for the APD 180, and so on. In aspects, one or more surface configurations or phase vectors may be mapped or calibrated to specific angle information of incident and/or reflective wireless signals (e.g., reference signals), signal rays, beamformed transmission of the base station 120, or the like. Alternatively or additionally, the surface-configuration codebook 408 includes multiple APD positions for each surface configuration (e.g., a first entry/row in the codebook corresponds to a first surface configuration at a first APD position, a second entry/row in the codebook corresponds to the first surface configuration at a second APD position). In aspects, the various surface configurations in the surface-configuration codebook may reference angular information associated with the surface configuration, which enables the base station 120 to determine angular information relating to signals transmitted to the APD 180, signals reflected by the APD 180, and/or signals reaching the UE 110.

The surface-configuration information stored in a codebook can correspond to a full configuration that specifies an exact configuration (e.g., configure with this given set of values) or a delta configuration that specifies a relative configuration (e.g., modify a current state by this given set of values). In one or more implementations, the phase-configuration information specifies a directional increment and/or angular adjustment between an incident signal and a transformed signal. For instance, the phase configuration 0 can specify an angular-adjustment configuration for configurable surface element 402 such that the configurable surface element 402 reflects the incident wireless signal with a "phase configuration 0" relative angular or directional shift.

As shown in FIG. 4, the base station 120 communicates an indication to the APD 180 that specifies a surface configuration, such as by communicating the indication using the wireless link 134 (e.g., an APD-slow-control channel, an APD-fast control channel) and any combination of physical layer/layer-1 signaling, MAC layer/layer-2 signaling, and/or RLC layer/layer-3 messaging). In the present example, the indication specifies a surface-configuration index 410 (SC index 410) that maps to a corresponding surface configuration of the APD 180. In response to receiving the indication, the APD manager 320 retrieves the surface configuration from the surface-configuration codebook 408 using the index and applies the surface configuration to the RIS. For example, the APD manager 320 configures each configurable surface element as specified by a respective entry in the surface-configuration codebook 408.

In various implementations, the base station 120 communicates timing information (not shown) to the APD 180, which may be included with a surface configuration. For instance, the base station 120 sometimes indicates, to the APD 180 and using the wireless link 134, a start time for the application of an indicated surface configuration or beam-sweeping pattern, a stop time that indicates when the APD may remove and/or change the surface configuration, and/or a timing offset (e.g., an advance or delay from the start time) on when to start applying the indicated surface configuration. By specifying the timing information, the base station 120 can synchronize and/or configure the APD 180 to a particular UE (e.g., UE 110) and/or particular groups of UEs as described with reference to FIG. 5. To maintain synchronized timing with the base station 120, the APD 180 receives and/or processes a base station synchronizing signal.

Multi-UE-Communication Transmissions Using APDs

Wireless communication systems broadcast and/or multicast transmissions to multiple UEs, such as transmissions carrying system information blocks (SIBs), emergency alerts, evolved multimedia broadcast multicast services (eMBMS), paging information, and so forth. When a base station uses high frequencies (e.g., above 6 GHz) to broadcast and/or multicast transmissions to the multiple UEs, the transmissions become more susceptible to multipath fading and other types of path loss, which lead to recovery errors at multiple receivers. In aspects, a base station configures an APD surface to route incident signals towards groups of UEs, such as by configuring the APD surface to widen or narrow a beam width of the reflected signal relative to the incident signal.

Figure 5:
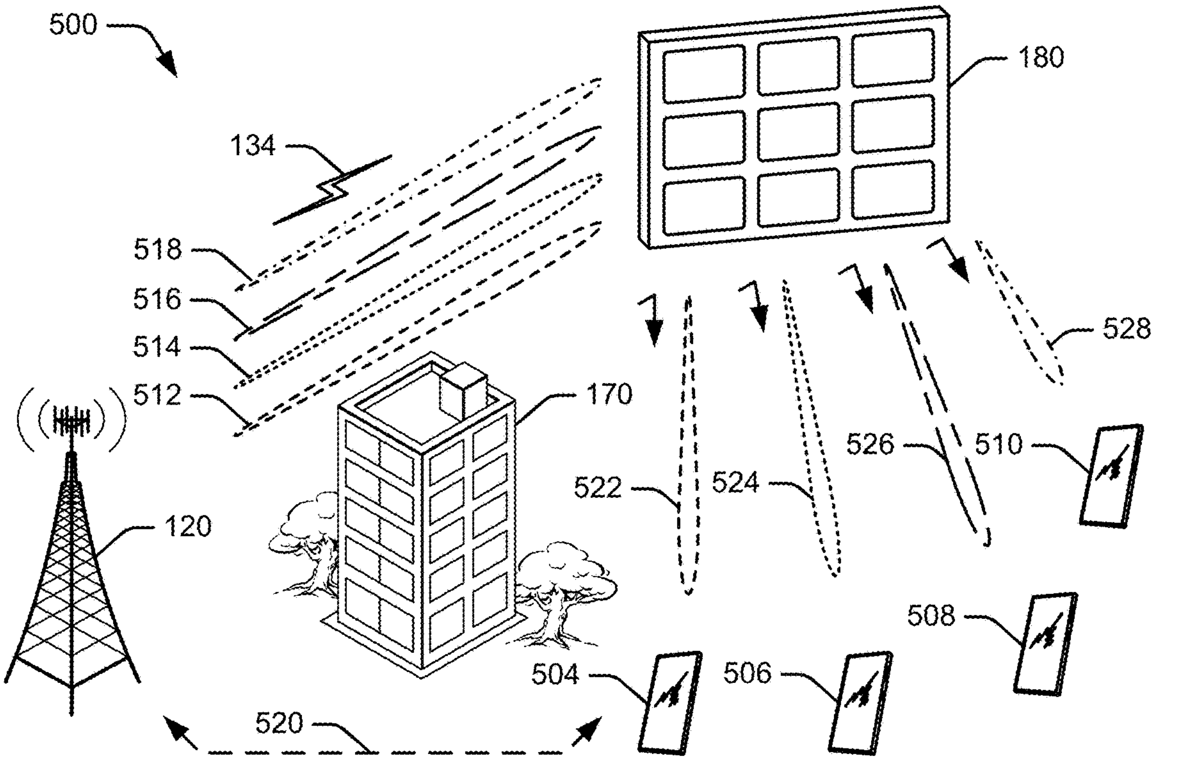
FIG. 5 illustrates an example environment that can be used to implement various aspects of multi-UE-communication transmissions using APDs.
Figure 5:
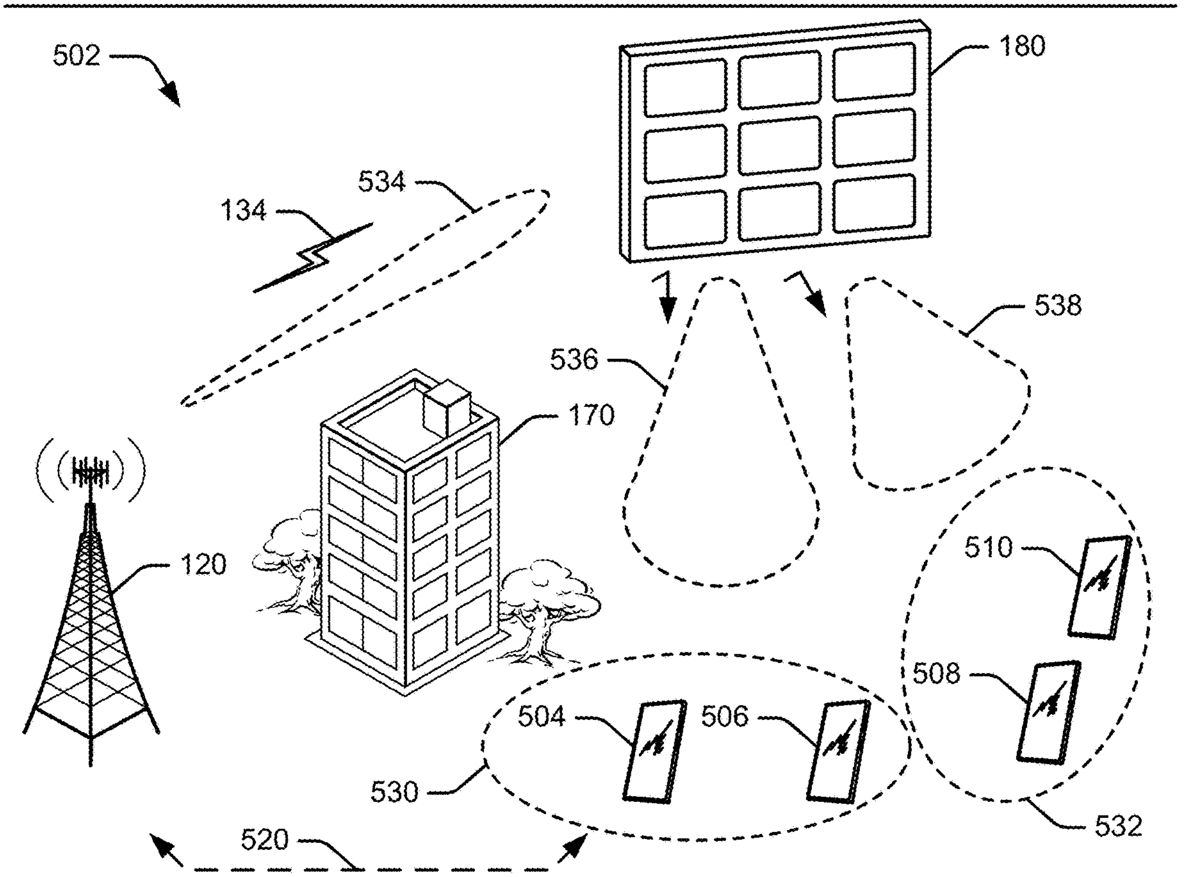

FIG. 5 illustrates a first example environment 500 and a second example environment 502 that can be used to implement various aspects of multi-UE-communication transmissions using APDs. The environments 500 and 502 include the base station 120, the APD 180, and the obstructions 170 of FIG. 1. The environments 500 and 502 also include multiple instances of the UE 110 of FIG. 1, labeled as UE 504, UE 506, UE 508, and UE 510, respectively. While the environments 500 and 502 show four instances of the UE 110, other aspects include any other number of UEs.

In the environment 500, the base station 120 communicates with each UE (e.g., the UE 504, the UE 506, the UE 508, the UE 510) using multiple (unicast) wireless signals (e.g., a first (narrow-beam) wireless signal 512, a second (narrow-beam) wireless signal 514, a third (narrow-beam) wireless signal 516, a fourth (narrow-beam) wireless signal 518) shown in the environment 500 as downlink narrow-beam transmissions, and the surface of the APD 180 to route the wireless signals around the obstructions 170. To illustrate, assume the base station 120 first establishes a low-band wireless link 520 (e.g., using frequencies below 6 GHz) with the UE 504 and then attempts to establish a high-band wireless link (e.g., using frequencies above 6 GHz) with the UE 504. Using the low-band wireless link 520, the UE 504 communicates any combination of information to the base station 120, such as UE-location information (e.g., from global navigation satellite system (GNSS) information), downlink signal-quality and/or link-quality measurements associated with high-band wireless signals, and so forth as described with reference to FIG. 4. In some aspects, the base station 120 generates uplink signal-quality and/or link-quality measurements on high-band uplink wireless signals from the UE 504. For visual clarity, the environment 500 shows the base station 120 establishing/using the low-band wireless link 520 to communicate with the UE 504, but the base station 120 can alternatively or additionally establish a respective low-band wireless link with any of the UE 506, the UE 508, and/or the UE 510.

Using any combination of the received and/or generated information, the base station 120 of the environment 500 determines to include the APD 180 in a communication path with the UE 504 for high-band communications and determines a unicast surface configuration for the APD 180 (e.g., a surface configuration for unicast transmissions with a single UE) as described with reference to FIG. 4. In some aspects, the base station 120 selects a unicast surface configuration for the RIS that transforms the first (narrow-beam) wireless signal 512 into a first (narrow-beam) reflected wireless signal 522 that propagates towards the UE 504. Alternatively or additionally, the base station 120 determines and/or selects a unicast surface configuration that transforms and/or reflects uplink wireless signals from the UE 504 to the base station 120 in a reciprocal manner (not illustrated). The base station 120 indicates the unicast surface configuration to the APD 180 via the wireless link 134. While this example describes the base station 120 communicating with the UE 504 over a low-band wireless link to establish the (unicast) high-band wireless link using the surface of the APD 180, other implementations can establish the high-band wireless link using the surface of the APD 180 without the base station 120 communicating with the UE 504 over a low-band wireless link. For instance, the base station 120 may analyze uplink signal-quality and/or link-quality measurements associated with the high-band wireless link and determine to include the surface of the APD 180 within a communication path without receiving UE-location information and/or downlink signal-quality and/or link-quality measurements from the UE 504.

In a similar manner, the base station 120 determines and/or selects a second unicast surface configuration for unicast transmissions with the UE 506, a third unicast surface configuration for unicast transmissions with the UE 508, and a fourth unicast surface configuration for unicast transmissions with the UE 510. The second unicast surface configuration, for instance, when applied to the RIS of the APD 180, configures the surface to transform the second, narrow-beam wireless signal 514 into a second narrow-beam reflected wireless signal 524 that propagates towards the UE 506. The third unicast surface configuration, when applied to the RIS of the APD 180, configures the surface to transform the third, narrow-beam wireless signal 516 into a third, narrow-beam reflected wireless signal 526 that propagates towards the UE 508. The fourth surface configuration, when applied to the RIS of the APD 180, causes the surface to transform the fourth, narrow-beam wireless signal 518 into a fourth, narrow-beam reflected wireless signal 528 directed towards the UE 510. Alternatively or additionally, the base station 120 selects unicast surface configurations that route uplink communications from the UE 506, the UE 508, and/or the UE 510 in reciprocal manners (not illustrated).

The base station 120 may determine and/or select surface configurations (e.g., the unicast surface configurations of the environment 500, the multi-UE-communication surface configurations of the environment 502) based on apportioning access to the APD 180, such as panel-partitioned access and/or time-partitioned access. As one example, the base station 120 selects surface configurations based on panel-partitioning (e.g., apportioning configurable surface elements) such that the base station transmits the respective unicast transmissions to each receiving UE contemporaneously and/or simultaneously as shown in the environment 500. To illustrate panel-partitioned access to the surface of the APD 180, the base station 120 apportions the configurable surface elements of the APD 180 into subsets of configurable surface elements, such as horizontal partitioning that groups a first subset of configurable surface elements (of the RIS) that are in a same horizontal row, vertical partitioning that groups a second subset of configurable surface elements that in a same vertical column, quadrant partitioning that groups subsets of configurable surface elements that are in a same quadrant of the RIS, and/or any other combination of suitable partition geometries.

Based on the apportioned access, the base station 120 selects the first surface configuration for modifying a first subset of configurable surface elements of the APD 180, the second surface configuration for modifying a second subset of configurable surface elements of the APD 180, and so forth. When each surface configuration uses different configurable surface elements of the APD 180, the base station 120 can transmit the separate unicast transmissions towards the APD surface contemporaneously and/or simultaneously by directing each unicast transmission towards the respective subset of configurable surface elements.

Alternatively or additionally, the base station 120 determines and/or selects the surface configurations based on time-partitioned access. In other words, the base station 120 apportions access to the surface of the APD 180 based on time. For example, the base station 120 directs the APD 180 to apply the first surface configuration over a first time-duration, the second surface configuration over a second time-duration, and so forth, where the time-durations do not overlap. Based on the time-partitioning, the base station 120 transmits the first narrow-beam wireless signal (e.g., a first unicast transmission) towards the surface of the APD 180 during the first time-duration, the second narrow-beam wireless signal (e.g., a second unicast transmission) towards the surface of the APD 180 during the second time-duration, and so forth (not shown in the environment 500).

In some aspects, the base station 120 determines and/or selects surface configurations based on partitioning and/or sharing access with a second base station. The base station 120, for instance, selects a surface configuration based on time-partitioned access to the APD surface, where a first base station (e.g., the base station 121) accesses the surface of the APD during a first time-duration and a second base station (e.g., the base station 122) accesses the surface of the APD during a second, non-overlapping time-duration. Alternatively or additionally, the base station selects a surface configuration based on panel-partitioned access (e.g., apportioning configurable surface elements) to the APD surface, where the first base station uses a first subset of configurable surface elements of the APD and the second base station uses a second subset of configurable surface elements. The first and second base stations may or may not use the first and second subsets of configurable surface elements simultaneously (e.g., overlapping time-durations).

In the environment 502, the base station 120 determines to broadcast and/or multicast transmission(s) to multiple UEs based on any suitable trigger event. The base station 120, for example, determines to broadcast and/or multicast transmission(s) in response to receiving one or more UE-requests from UEs connected to the base station 120, such as requests for multicast services (e.g., real-time video, real-time audio) from any combination of the UE 504, the UE 506, the UE 508, and/or the UE 510. To illustrate, a UE transmits a request for the multicast service using unicast control signals (e.g., using the low-band wireless link 520). However, the base station can alternatively determine to broadcast and/or multicast transmissions to multiple UEs without receiving any UE-requests and/or without being connected to any UE. To illustrate, based on a timer expiration and/or a repetition scheme, the base station 120 determines to broadcast SIB information, which may occur independently of whether the base station 120 has established any unicast connections with UEs. In other words, the base station 120 determines to broadcast the transmissions when the base station has not established any unicast connections with any UEs. As another example, the base station determines to broadcast and/or multicast transmissions based on receiving directions from the core network 150 (FIG. 1) to transmit paging information and/or emergency information.

Based on determining to broadcast and/or multicast transmissions, the base station sometimes selects groups of UEs to receive the transmission(s), such as UE-group 530 that includes the UE 504 and the UE 506 and UE group 532 that includes the UE 508 and the UE 510. The base station 120, for instance, identifies the UEs 504, 506, 508, and 510 based on the unicast connections established in the environment 500. The base station clusters the identified UEs based on analyzing various types of information, such as UE-location, signal strength, UE-requested services, APD surface configurations, and so forth. As one example, the base station 120 determines to group the UE 504 and the UE 506 based on UE-location information and identifying that the two UEs reside within a threshold distance from one another. As another example, the base station 120 determines to group the UE 508 and the UE 510 based on identifying that the respective surface configurations used to transmit unicast transmissions to the UEs are comparable (e.g., the resultant reflection angles being within a threshold value of one another). In other words, the base station 120 identifies the transmission directions of the reflected wireless signals to the UEs 508 and 510 are within a threshold value and determines to group the UEs for broadcast and/or multicast transmissions.

In aspects, the base station 120 regroups the UEs based on various changes in an operating environment, such as respective UE-location changes, signal-quality measurement changes, and/or link-quality measurement changes among the group of UEs. To illustrate, assume the UE 506 moves towards the UE 510. As the UE 506 moves, the base station 120 identifies that the UE 506 is moving away from the UE 504 and/or towards the UE 510. Based on the location change, the base station 120 determines to regroup the UE 506 from the UE group 530 to the UE group 532 for broadcast and/or multicast transmissions.

To broadcast and/or multicast transmissions to multiple UEs using an APD, the base station 120 directs the APD to apply one or more multi-UE-communication surface configurations (e.g., a surface configuration for broadcasting and/or multicasting transmissions to multiple UEs). As one example of a multi-UE-communication surface configuration that spatially widens the reflection of an incident wireless signal, a base station selects a surface configuration that turns off some of the configurable surface elements. To further illustrate, the behavior/operation of the APD is similar to an antenna array. Generally, controlling more antenna elements in an antenna array increases an aperture size (e.g., measured in wavelengths) of the antenna array and creates a main lobe with a spatially narrower beam width relative to using fewer antenna elements. For example, assume a first antenna array uses "X" number of antenna elements such that the first antenna array has a larger aperture size relative to a second antenna array. When transmitting waveforms with a same wavelength, the first antenna array radiates the wireless signal with a main lobe that has a spatially-narrower beam width relative to the second antenna array. In a similar manner, and based on antenna theory, a number of reflective elements (e.g., configurable surface elements) used to reflect a wireless signal by an APD affects the radiation pattern (e.g., beam width) of the reflected signal. In applying this antenna theory to a RIS, using a first APD surface configuration that activates/uses more reflective elements of an APD (and with a particular surface configuration) to reflect an incident wireless signal results in a (reflected) main lobe with a narrower beam width relative to a second APD surface configuration that utilizes fewer (e.g., deactivates) reflective elements. In aspects, to produce a spatially-wider reflected beam, the base station 120 selects a surface configuration for the APD 180 that uses fewer configurable surface elements (e.g., turns off specified configurable surface elements) to create a (reflected) main lobe that has a wider beam width than the incident main lobe.

As another example, the base station 120 selects a multi-UE-communication surface configuration that scatters an incident signal ray (e.g., each configurable surface element modified by the multi-UE-communication surface configuration reflects an incident signal ray differently to spatially spread the reflected wireless signal). For instance, a first configurable surface element reflects an incident signal ray at X degrees horizontally, a second configurable surface element reflects an incident signal ray at X+5 degrees horizontally, a third configurable surface element reflects an incident signal ray at X−5 degrees horizontally, and so forth.

The base station 120 determines and/or selects the multi-UE-communication surface configurations for an APD in similar manners as described with reference to FIG. 4 and unicast surface configurations. In aspects, the base station determines and/or selects a multi-UE-communication surface configuration that spatially modifies a transmission coverage area (e.g., widen a horizontal and/or vertical span, narrow a horizontal and/or vertical span) of a reflected wireless signal relative to the corresponding incident wireless signal. The selected multi-UE-communication surface configurations can correspond to downlink and/or uplink transmissions, such as a downlink transmission from a base station to multiple UEs or an uplink transmission from a UE to a non-stationary base station (e.g., a satellite, a mobile base station). As another example, the base station 120 selects a multi-UE-communication surface configuration that transforms an incident wide-beam wireless signal into a reflected narrow-beam wireless signal, such as that described with reference to FIG. 6. To illustrate, a moving transmitter (e.g., a moving base station/satellite) may transmit a wide-beam wireless signal towards an APD surface to increase the probability of reaching the APD surface, and the APD surface transforms the incident wide-beam wireless signal into a reflected narrow-beam wireless signal directed towards a single UE. In other words, a multi-UE-communication surface configuration applied to the APD surface configures the APD surface to perform reflective functionality similar to a parabolic reflector. As another example, a transmitter may transmit a wide-beam wireless signal towards a moving APD surface (e.g., an APD mounted to a drone, an APD mounted on rails) to increase the probability of reaching the APD surface. The base station can alternatively or additionally select surface configurations that maintain the spatial coverage of an incident wide-beam wireless signal. Thus, the base station 120 may select a surface configuration with various signal transformation properties (e.g., wide-beam to wide-beam, narrow-beam to narrow-beam, wide-beam to narrow-beam, narrow-beam to wide-beam).

In some aspects, the base station 120 determines and/or selects a multi-UE-communication surface configuration based on one or more unicast surface configurations. To illustrate, the base station 120 selects a first multi-UE-communication surface configuration for the UE group 530 based on one or more of the unicast surface configurations used for the UE 504 and/or the UE 506 and a second multi-UE-communication surface configuration for the UE group 532 based on one or more of the unicast surface configurations used for UE 508 and/or the UE 510. The base station 120, for instance, identifies the reflection angles of the APD surface when the APD applies each unicast surface configuration, averages the reflection angles, and selects a multi-UE-communication surface configuration based on the averaged reflection angle. As another example, the base station 120 selects a multi-UE-communication surface configuration that configures the APD surface to reflect an incident wireless signal at a same reflection angle as a unicast surface configuration but spatially modified (e.g., widened beam width, narrowed beam width).

Alternatively or additionally, the base station 120 determines and/or selects a beam-sweeping pattern to reach multiple UEs. Generally, a beam-sweeping pattern corresponds to an order of surface configurations that an APD cycles through (e.g., applies each surface configuration in succession) to beam-sweep (reflected) signals in a horizontal direction and/or vertical direction. The beam-sweeping pattern may also indicate a time duration for applying each surface configuration and/or a position adjustment that moves the APD 180. Depending on the beam-sweeping pattern, as the APD changes the applied surface configuration, the transmission direction of the reflected wireless signal changes. This allows the base station to direct broadcast and/or multicast transmission beams towards the surface of the APD in a consistent direction and have the transmissions reach multiple UEs operating in different locations from one another based on how the APD surface reflects the transmission as further described.

In some aspects, the base station 120 selects and/or determines the beam-sweeping pattern based on a repetition scheme, such as periodic downlink transmissions (e.g., SIB transmissions). This can include the base station 120 selecting the beam-sweeping pattern from a beam-sweeping codebook and/or the base station 120 communicating a sequence of surface configurations and/or time durations to the APD 180 using the wireless link 134. As one example, the base station 120 selects a beam-sweeping pattern that cycles through multiple multi-UE-communication surface configurations over a repeat time-duration that is an integer multiple of the periodic transmissions (e.g., multiple SIB transmissions), where the APD 180 applies a respective multi-UE-communication surface configuration during a respective sub-period of the repeat time-duration. In other words, based on the beam-sweeping pattern, the APD applies a first multi-UE-communication surface configuration during a first sub-period of the repeat time duration, a second multi-UE-communication surface configuration during a second sub-period of the repeat time duration, and a third multi-UE-communication surface configuration during a third sub-period of the repeat time duration. The base station 120 transmits a SIB during each sub-period by directing a narrow-beam wireless signal carrying the SIB towards the APD surface. Because the APD changes the applied multi-UE-communication surface configuration during each sub-period, the reflected wide-beam wireless signals carrying the SIB propagate in different directions during each sub-period and (potentially) reach a different group of UEs. As another example, when the APD 180 supports panel-partitioned access, the base station 120 directs the APD 180 to apply different sets of unicast surface configurations, where the APD 180 applies each unicast surface configuration to a respective sub-set of configurable surface elements. This can include the base station 120 using the sets of unicast surface configurations (e.g., panel-partitioned access) in conjunction with, or without, time-partitioning. To illustrate, when the base station 120 uses panel-partitioning in conjunction with time-partitioning, the base station 120 directs the APD 180 to apply a first set of unicast surface configurations (based on subsets of configurable surface elements) during the first sub-period, a second set of unicast surface configurations during the second sub-period, and so forth. In aspects, the APD repeats the beam-sweeping pattern as directed by the base station 120.

In the environment 502, the selected multi-UE-communication surface configuration applied at the APD 180 transforms a (downlink) incident narrow-beam wireless signal 534 (with a first signal strength) into a reflected wide-beam wireless signal 536 (with a second, lower signal strength) and/or a reflected wide-beam wireless signal 538 (with a third, lower signal strength), where the signal strengths affect the propagation distance of the wireless signal. In other words, because the reflected wide-beam wireless signals have lower signal-strengths relative to the incident, narrow-beam wireless signal, the reflected wide-beam wireless signals reach a shorter distance relative to the narrow-beam wireless signal. For visual clarity, the environment 502 shows the APD 180 reflecting and/or transforming the incident narrow-beam wireless signal 534 into the reflected wide-beam wireless signal 536 and the reflected wide-beam wireless signal 538 simultaneously and using panel-partitioning (e.g., a first subset of configurable surface elements configured to transform the incident narrow-beam wireless signal 534 into the reflected wide-beam wireless signal 536, a second subset of configurable surface elements configured to transform the incident narrow-beam wireless signal 534 into the reflected wide-beam wireless signal 538). However, in other aspects, the APD 180 reflects the incident narrow-beam wireless signal 534 into the reflected wide-beam wireless signals 536 and 538 at different time durations (not shown in the environment 502), such as based on a beam-sweeping pattern as further described.

While the above examples describe a base station determining to broadcast or multicast transmissions to groups of UEs, in alternative or additional aspects, the base station 120 configures the APD 180 with multi-UE-communication surface configuration(s) for transmitting multiple-unicast transmissions to multiple UEs. For instance, the base station identifies groups of UEs and schedules transmissions to the UEs using shared air interface resources. To illustrate, the base station assigns a same time slot with adjacent air interface resources (e.g., resource blocks, resource elements, frequency allocations) for (respective) unicast transmissions to the UEs grouped by the base station 120. To illustrate, the base station 120 transmits a first unicast transmission to a first UE (e.g., the UE 504) in the assigned time slot using a first frequency allocation and transmits a second unicast transmission to a second UE (e.g., the UE 506) in the same assigned time slot using a second frequency allocation in the narrow-beam wireless signal 534. The APD 180 then reflects the narrow-beam wireless signal 534 as the wide-beam wireless signal 536 based on a first multi-UE surface configuration applied to the APD surface as further described. As another example, the base station 120 transmits UE-specific signals, information, and/or data for the UE 508 and the UE 510 using different air interface resources of a Physical Downlink Shared Channel (PDSCH) and the narrow-beam wireless signal 534. The APD 180 reflects the narrow-beam wireless signal 534 as the wide-beam wireless signal 538 based on a second multi-UE surface configuration applied to the APD surface as further described.

Figure 6:
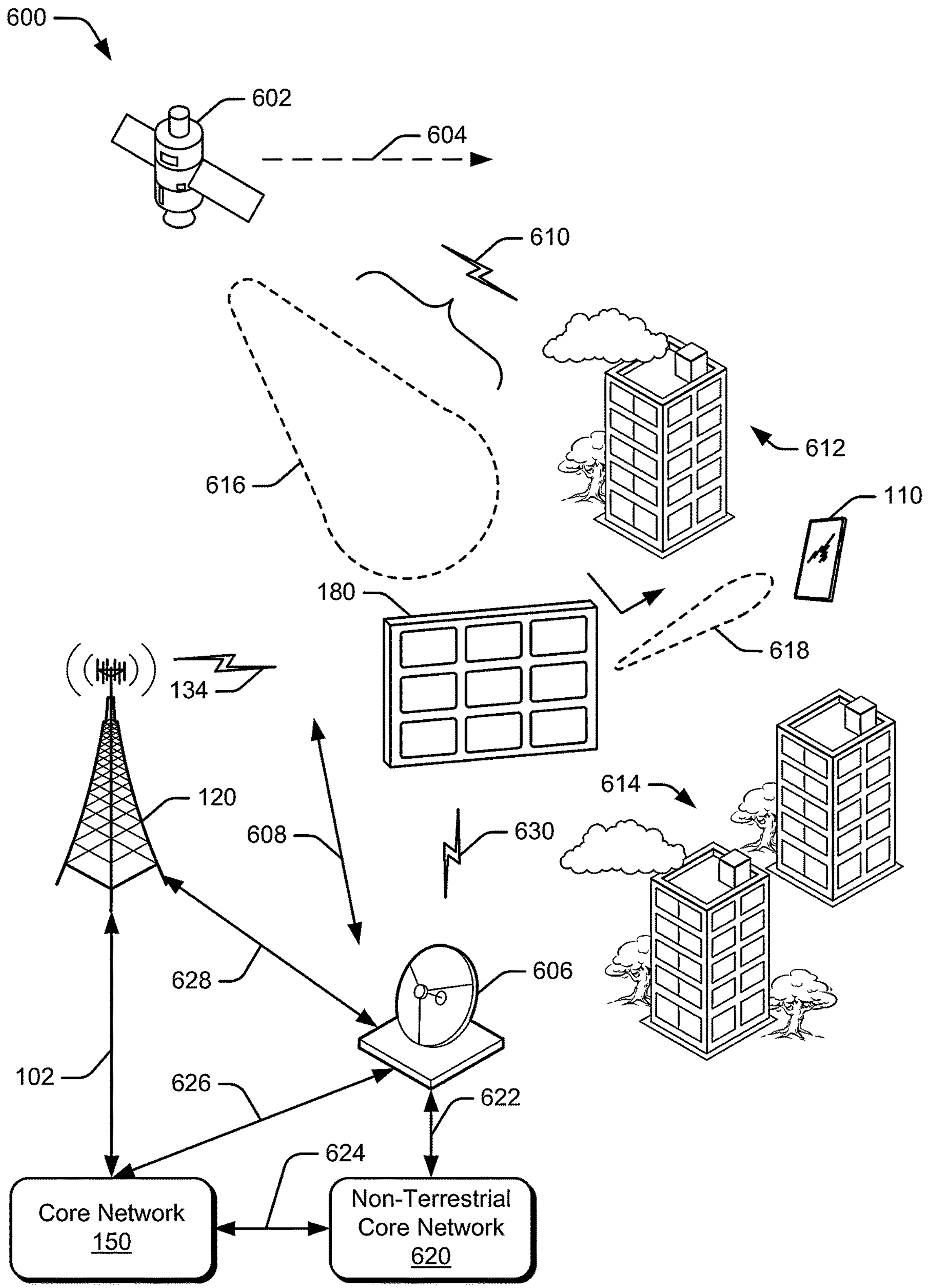
FIG. 6 illustrates an example environment that can be used to implement various aspects of multi-UE-communication transmissions using APDs.

FIG. 6 illustrates an example environment 600 that can be used to implement various aspects of multi-UE-communication transmissions using APDs. The environment 600 includes the base station 120, the UE 110, and the APD 180 of FIG. 1. The environment 600 also includes a non-terrestrial communication network, which, as shown in FIG. 6, includes a satellite 602 traveling along a path 604 that is in communication with a ground station 606 (through a radio interface 608 as further described) and the UE 110 through the wireless link 610. The wireless link 610, implemented by the satellite 602 (e.g., non-terrestrial base station) and the UE 110 in similar manners as described with reference to the wireless links 130 of FIG. 1, uses the surface of the APD 180 to route wireless signals around obstructions 612 and 614 and/or to spatially modify a wide-beam incident wireless signal 616 into a narrow-beam reflected wireless signal 618 that propagates towards the UE 110 in a manner similar to a parabolic reflector. Because the satellite 602 continuously moves along the path 604, transmitting a wide-beam wireless signal towards the APD surface increases the probability of the wireless signal striking the APD surface. While illustrated as downlink signals, the non-terrestrial communication platform alternatively or additionally uses the surface of the APD 180 to route and modify uplink narrow-beam wireless signals from the UE 110 into uplink wide-beam wireless signals that propagate towards the satellite 602 in a reciprocal manner.

In aspects, the ground station 606 and/or the base station 120 select a multi-UE-communication surface configuration for the APD 180 that transforms the incident wide-beam wireless signal 616 into the reflected narrow-beam wireless signal 618. To further illustrate, the ground station 606 and the satellite 602 communicate through the radio interface 608. The radio interface 608 supports gateway links (GWLs) connecting the satellite 602 to a non-terrestrial core network 620, such as through the ground station 606 (e.g., a remote radio units (RRU)) and interface 622. The non-terrestrial core network 620 can include and/or communicate with any combination of ground stations, servers, routers, switches, control elements, and the like. The ground station 606 can alternatively or additionally be referred to as an extension of a non-terrestrial base station. As shown, the non-terrestrial core network 620 communicates with the (terrestrial) core network 150 through an interface 624 and the ground station 606 through the interface 622 (e.g., N1, N2, and/or N3 interface). In different configurations, however, the satellite ground station 606 may connect to the (terrestrial) core network through interface 626 (e.g., N1, N2, and/or N3 interface) or to the base station 120 through a different interface 628.

In aspects, the non-terrestrial core network 620 obtains ephemeris data (e.g., timing information, current location, predicted location, trajectory information) about the satellite 602, such as through the interface 622 with the ground station 606, the interface 608 with the satellite 602, or interfaces with other network elements or servers. The non-terrestrial core network 620 may include an APD manager (not shown) in similar manners as described with reference to the BS APD manager 266 of FIG. 2. Through the APD manager, the non-terrestrial core network 620 uses the ephemeris data for the satellite 602 to select a multi-UE-communication surface configuration that transforms the wide-beam wireless signal 616 into the narrow-beam wireless signal 618 that propagates towards the UE 110 (e.g., configures the APD surface to focus and steer the wide-beam wireless signal 616 as a parabolic reflector). The non-terrestrial core network 620 may direct the ground station to communicate an indication of the multi-UE-communication surface configuration to the APD 180 using a wireless link 630 that represents an instance of an APD-control channel (e.g., an instance of the wireless link 134 of FIG. 1). This can include communicating timing information to the APD 180 and/or selecting the multi-UE-communication surface configuration based on partitioned-access as described with reference to FIG. 5. Alternatively, the non-terrestrial core network 620 communicates the indication of the selected multi-UE-communication surface configuration (sometimes with timing information) to the base station 120 through the interface 624, the core network 150, and the interface 102. In response to receiving the indication of the multi-UE-communication surface configuration, the base station 120 forwards the indication (with or without timing information) to the APD 180 using the wireless link 134. Alternatively or additionally, the non-terrestrial core network 620 communicates the ephemeris data to the base station 120, and the BS APD manager 266 of the base station 120 selects the multi-UE-communication surface configuration for the APD 180 using the ephemeris data.

While shown and described with reference to a non-terrestrial communication network, various aspects described with respect to FIG. 6 can be implemented without the satellite 602, the ground station 606, and the non-terrestrial core network 620. To illustrate, the base station 120 may select a multi-UE-communication surface configuration that configures the APD surface to provide wide-beam to narrow-beam reflections based on transmissions exchanged between the base station 120 and the UEs 110 and using techniques described with reference to FIGS. 4 and 5.

Modifying a surface configuration of the RIS changes how signals are transformed when they reflect off an RIS of an APD, such as by widening and/or narrowing the reflected wireless signal relative to the incident wireless signal. This allows a transmitter to transmit a narrow-beam high-frequency wireless signal to multiple receivers by using the APD surface to route the narrow-beam wireless signals around obstructions and spatially widen the signal. This also allows a mobile transmitter to transmit a wide-beam high-frequency wireless signal towards a fixed APD (or allow a fixed transmitter to transmit a wide-beam towards a mobile APD) to increase a probability of connecting to the APD surface and configuring the APD surface as a parabolic reflector to direct a concentrated signal towards an intended receiver. These techniques can improve transmission power efficiency and reduce signal interference relative to ultra-wide beam and omnidirectional transmissions.

Figure 7:
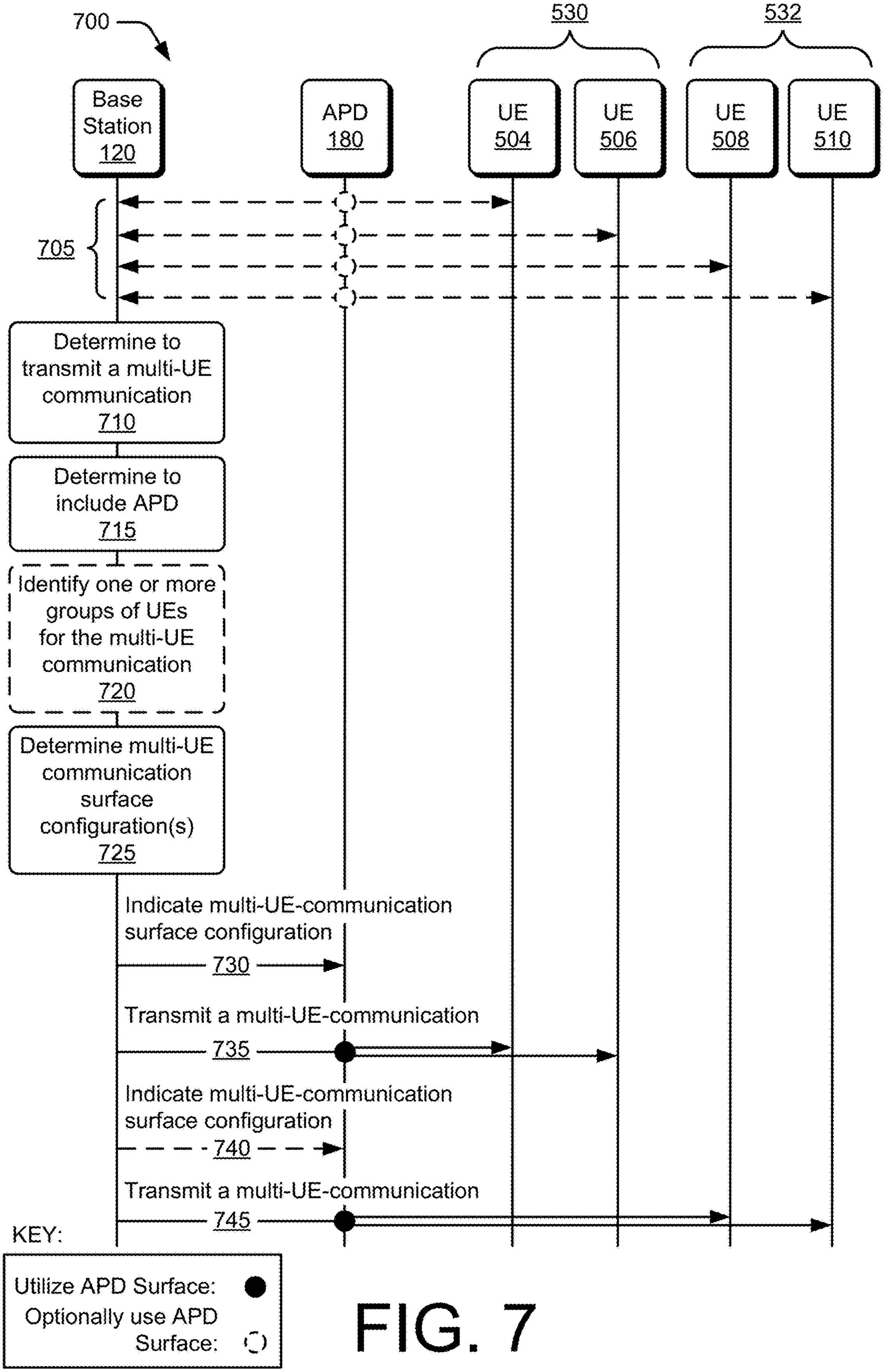
FIG. 7 illustrates an example transaction diagram between various network entities in accordance with various aspects of multi-UE-communication transmissions using APDs.

Signaling and Control Transactions for Multi-UE-Communication Transmissions Using APDs FIG. 7 illustrates an example signaling transaction diagram 700 in accordance with one or more aspects of multi-UE-communication transmissions using APDs. In aspects, the transactions may be performed by any combination of devices, including at least a base station (e.g., the base station 120), an APD (e.g., the APD 180), and multiple UEs (e.g., the UE 504, the UE 506, the UE 508, the UE 510). The example signaling and control transactions may be implemented using aspects as described with reference to any of FIGS. 1-6. While not shown in the diagram 700, the transactions shown and described can alternatively or additionally be implemented by entities of a non-terrestrial communication network, such as the satellite 602, the ground station 606, and/or the non-terrestrial core network 620 of FIG. 6.

At 705, the base station 120 optionally communicates with one or more of the UE 504, the UE 506, the UE 508, and/or the UE 510. This can include the base station 120 communicating with one or more of the UEs 504, 506, 508, and/or 510 using a respective low-band wireless link (e.g., below 6 GHz) and/or the base station 120 communicating with one or more of the UEs 504, 506, 508, and/or 510 using a respective high-band wireless link (e.g., above 6 GHz), where each respective high-band wireless link may optionally include the surface of the APD 180 in a respective communication path between the UE and the base station 120. As described with reference to FIG. 5, to communicate with the UEs 504, 506, 508, and/or 510 using the surface of the APD, the base station 120 may: i) determine to include an APD in a communication path with any one of the UEs 504, 506, 508, and/or 510, ii) select respective unicast surface configurations for the APD 180, and iii) direct the APD 180 to apply the respective unicast surface configurations (not illustrated in the diagram 700).

At 710, the base station determines to transmit a multi-UE communication (e.g., broadcast or multicast) based on any suitable trigger event as described with reference to FIG. 5. As one example, the base station 120 receives a UE-request from one or more of the UEs 504, 506, 508, and/or 510 at 705, where one or more UEs requests a multicast service, such as streaming video of a real-time sporting event. As another example, the base station 120 receives directions to transmit broadcast and/or multicast communications, such as paging information or an emergency alert. As yet another example, the base station determines to broadcast SIBs based on a repetition scheme and/or a timer expiration.

At 715, the base station 120 determines to include (and selects) an APD in a communication path for a wireless signal carrying the multi-UE communication. For example, as described with reference to FIG. 4, the base station 120 analyzes signal-quality and/or link-quality measurements and determines the measurements have fallen below an acceptable threshold value. As another example, the base station 120 analyzes historical records that indicate base station transmissions historically reach an intended receiver by including an APD in a communication path. In some aspects, the base station 120 selects, as the APD to include in the communication path, an APD used for unicast transmissions (e.g., the APD 180 used at 705), based on proximity to a cluster of UEs (e.g., selects an APD within a threshold distance to the cluster of UEs), and/or by analyzing historical records.

At 720, the base station 120 optionally identifies one or more groups of UEs for the multi-UE-communication transmission. In aspects, the base station identifies the groups of UEs using any combination of information, such as UE-location information, signal-quality and/or link-quality measurements, unicast surface configurations, UE-requests, and so forth, received at 705 and as described with reference to FIG. 5.

At 725, the base station 120 determines one or more multi-UE-communication surface configurations. As one example, as described with reference to FIG. 5, the base station 120 selects the multi-UE-communication surface configuration based on a unicast surface configuration, such as unicast surface configurations utilized at 705. Alternatively or additionally, the base station 120 determines and/or selects a beam-sweeping pattern from a beam-sweeping codebook, where the beam-sweeping pattern cycles through multiple multi-UE-communication surface configurations in succession and based on time information. In aspects, the base station 120 selects the multi-UE-communication surface configurations based on a repetition scheme, such as a transmission repetition scheme (e.g., SIBs) and/or partitioned access (e.g., time-partitioned access, panel-partitioned access) to the APD surface. This can include the base station 120 selecting a multi-UE-communication surface configuration that transforms an incident narrow-beam wireless signal into a reflected wide-beam wireless signal, or an incident wide-beam wireless signal into a narrow-beam wireless signal. In aspects these transformations affect a propagation distance of the reflected wireless signal based on signal strength as previously described.

At 730, the base station 120 indicates the surface configuration to the APD 180, such as by using the wireless link 134 and any combination of layer-1 signaling, layer-2 signaling, and/or layer-3 messaging as described with reference to FIG. 4. To illustrate, the base station 120 transmits an indication of an index value to the APD 180 using an APD-control channel, where the index value maps to an entry in a codebook as described with reference to FIG. 4.

At 735, the base station 120 transmits (e.g., broadcasts and/or multicasts) a multi-UE communication by directing a wireless signal (e.g., a narrow-beam wireless signal carrying the multi-UE communication) towards the surface of the APD 180 and/or a particular subset of configurable surface elements. In aspects, the base station transmits the multi-UE-communication based on timing information and/or partitioned access to the APD. As one example, the base station transmits the multi-UE communication directed to the UE group 530 at 730 using a time-duration and/or subset of configurable surface elements associated with transmissions to the UE-group 530. The incident wireless signal carrying the multi-UE communication strikes the surface of the APD 180 at a time when, in this example, the surface configuration spatially widens the reflected wireless signal relative to the incident wireless signal such that the reflected wireless signal reaches the UE 504 and the UE 506. While the diagram 700 shows the base station 120 transmitting the multi-UE communication towards the UE group 530, the base station 120 may alternatively transmit the multi-UE communication without grouping UEs explicitly and/or without having established unicast connections with UEs as further described with reference to FIG. 5.

At 740, the base station optionally indicates a second multi-UE-communication surface configuration to the APD 180. To illustrate, assume the multi-UE-communication surface configuration indicated at 725 only pertains to configuring the APD surface of the APD 180 for multi-UE-communication transmissions directed to the UE group 530. To broadcast and/or multicast multi-UE communications to the UE group 532, the base station 120 optionally indicates a second multi-UE-communication surface configuration to the APD 180, where the second multi-UE-communication surface configuration modifies the APD surface to route and/or spatially widen reflected wireless signals towards the UE group 532. However, the base station 120 alternatively indicates a beam-sweeping pattern at 730 such that the APD 180 autonomously changes the applied surface configuration from the first multi-UE-communication surface configuration to the second multi-UE-communication surface configuration based on the beam-sweeping pattern/timing information and without receiving further directions from the base station 120. As another example, the base station 120 indicates two multi-UE-communication surface configurations and timing information (e.g., an offset value, an absolute time value) to the APD 180 at 730, such that the base station 120 does not communicate a multi-UE-communication surface configuration at 740. For example, at 730, the base station 120 directs the APD 180 to apply the first multi-UE-communication surface configuration at an absolute time of XX:XX:XX and to apply the second multi-UE-communication surface configuration at a Y millisecond (msec.) offset from the absolute time (XX:XX:XX+Y).

At 745, the base station 120 transmits a multi-UE communication to the UE group 532 by transmitting a wireless signal carrying the multi-UE communication towards the surface of the APD 180. Similar to that described at 730, this can be based on timing information, partitioned access to the APD surface, and so forth.

In some aspects, the base station 120 iteratively performs various transactions included in the diagram 700 (not shown). For example, the base station 120 may regroup UEs based on location changes (e.g., as described at 720). Alternatively or additionally, the base station 120 may select updated multi-UE-communication surface configuration(s) based on signal-quality and/or link-quality parameters that fall below an acceptable performance threshold (e.g., as described at 725) and communicate the updated multi-UE-communication surface configuration(s) to the APD (e.g., as described at 730).

Example Methods for Multi-UE-Communication Transmissions Using APDs

Figure 8:
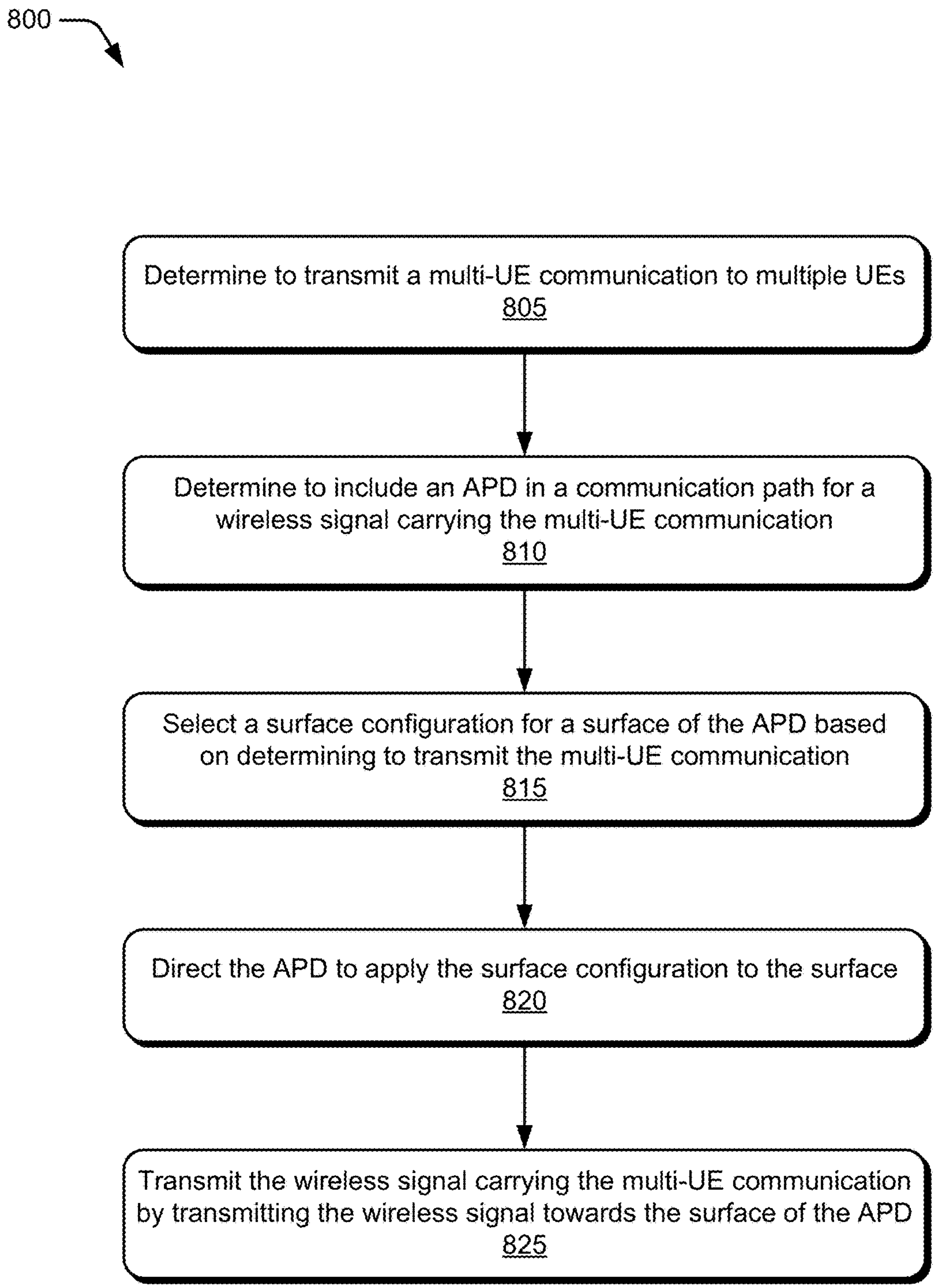
FIG. 8 illustrates an example method in accordance with various aspects of multi-UE-communication transmissions using APDs.

Example method 800 is described with reference to FIG. 8 in accordance with one or more aspects of multi-UE-communication transmissions using APDs. The example method 800 used to perform aspects of multi-UE-communication transmissions using APDs may be performed by a base station, such as the base station 120 of FIG. 1.

At 805, a base station determines to transmit a multi-UE communication to multiple UEs. As one example, the base station (e.g., base station 120) determines to broadcast and/or multicast the multi-UE communication to a group of UEs (e.g., the UE-group 530, the UE group 532) based on a trigger event as described at 710 of FIG. 7 and with reference to FIG. 5. In aspects, the base station 120 determines to transmit the multi-UE communication based on established unicast connections with the group of UEs, while in other aspects, the base station 120 determines to transmit the multi-UE communication independently of and/or without having established the unicast connections as further described at 710 of FIG. 7 and with reference to FIG. 5.

At 810, the base station determines to include an APD in a communication path for a wireless signal carrying the multi-UE communication. For example, as described with reference to FIG. 4 and described at 725 of FIG. 7, the base station (e.g., the base station 120) determines to include the APD (e.g., the APD 180) by analyzing signal-quality and/or link-quality measurements based on unicast transmissions and/or by analyzing historical records.

At 815, the base station selects a surface configuration for a surface of the APD based on determining to transmit the multi-UE communication. To illustrate, the base station (e.g., the base station 120) selects the surface configuration based on UE-location information, signal-quality and/or link-quality measurements, unicast surface configurations, historical records, and so forth, as described at 725 of FIG. 7 and described with reference to FIGS. 4-6. For example, the base station selects the surface configuration based on UE-location information, signal-quality and/or link-quality measurements, unicast surface configurations, relative to the UEs in the group of UEs. In aspects, the base station 120 selects a beam-sweeping pattern as the surface configuration and/or based on partitioned-access to the APD surface as further described with reference to FIG. 5.

At 820, the base station directs the APD to apply the surface configuration to the surface. For example, the base station (e.g., the base station 120) transmits an indication of an index value into a codebook (e.g., the surface-configuration codebook 408) to the APD (e.g., the APD 180) using an APD-control channel (e.g., the wireless link 134) as described at 730 and at 740 of FIG. 7 and with reference to FIG. 4.

At 825, the base station transmits the wireless signal carrying the multi-UE communication by transmitting the wireless signal towards the surface of the APD. To illustrate, the base station (e.g., the base station 120) transmits a narrow-beam wireless signal (e.g., the narrow-beam wireless signal 534) towards the surface of the APD (e.g., the APD 180), where, upon striking the surface of the APD, transforms into a wide-beam wireless signal (e.g., the wide-beam wireless signal 536, the wide-beam wireless signal 538) as described with reference to FIG. 5 and at 735 and at 745 of FIG. 7.

The order in which the method blocks of the method 800 is described is not intended to be construed as a limitation, and any number of the described method blocks can be skipped or combined in any order to implement a method or an alternative method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or additionally, any of the functionality described herein can be performed, at least in part, by one or more hardware logic components, such as, and without limitation, Field-Programmable Gate Arrays (FPGAs), Application-Specific Integrated Circuits (ASICs), Application-Specific Standard Products (ASSPs), System-on-Chip systems (SoCs), Complex Programmable Logic Devices (CPLDs), and the like.

In the following text some examples are described:

Example 1: A method performed by a base station for communicating with multiple user equipments, UEs, using an adaptive phase-changing device, APD, the method comprising:

- configuring a communication path to include the APD for a wireless signal used to transmit a multi-UE communication to the multiple UEs;
- selecting a surface configuration for a surface of the APD based on determining to transmit the multi-UE communication;
- directing the APD to apply the surface configuration to the surface; and
- transmitting the wireless signal carrying the multi-UE communication by transmitting the wireless signal towards the surface of the APD.

Example 2: The method as recited in example 1, wherein selecting the surface configuration further comprises:

- selecting a first surface configuration that transforms an incident wireless signal into a first reflected wireless signal with a spatially-wider beam width relative to the incident wireless signal; or
- selecting a second surface configuration that transforms the incident wireless signal into a second reflected wireless signal with a spatially-narrower beam width relative to the incident wireless signal.

Example 3: The method as recited in example 1 or example 2, wherein selecting the surface configuration for the surface further comprises:

- receiving a unicast transmission from at least one UE of the multiple UEs using the surface of the APD and a unicast surface configuration for the surface; and selecting the surface configuration based on the unicast surface configuration.

Example 4: The method as recited in example 3, wherein selecting the surface configuration based on the unicast surface configuration further comprises:

- identifying a first reflection angle at the APD surface when configured with the unicast surface configuration and selecting, as the surface configuration, a multi-UE-communication surface configuration that configures the APD surface with a second reflection angle that is within a threshold value of the first reflection angle; or
- deactivating one or more configurable surface elements used by the unicast surface configuration.

Example 5: The method as recited in any one of examples 1 to 4, further comprising: selecting, as the multiple UEs, a group of UEs based on a respective UE-location of each UE in the multiple UEs.

Example 6: The method as recited in any one of examples 1 to 5, wherein transmitting the wireless signal to the multiple UEs further comprises:

- transmitting at least a first unicast transmission to a first UE of the multiple UEs and a second unicast transmission to a second UE of the multiple UEs using the wireless signal.

Example 7: The method as recited in example 6, wherein transmitting at least the first unicast transmission and the second unicast transmission using the wireless signal further comprises:

transmitting the first unicast transmission and the second unicast transmission using a same time slot for the first unicast transmission and the second unicast transmission, a first frequency allocation for the first unicast transmission, and a second frequency allocation for the second unicast transmission, wherein the first frequency allocation and the second frequency allocation are different.

Example 8: The method as recited in any one of examples 1 to 5, wherein transmitting the wireless signal further comprises:

assigning a same time slot of air interface resources used for a physical downlink shared channel, PDSCH, to each UE of the multiple UEs;

assigning a respective resource block of the air interface resources to each respective UE of the multiple UEs; and communicating to each UE of the multiple UEs using the PDSCH, the same time slot, and the assigned respective resource blocks.

Example 9: The method as recited in any one of examples 1 to 8, wherein the surface configuration is a first surface configuration, the multiple UEs is a first group of UEs, and the method further comprises:

selecting a second surface configuration for a second group of UEs different from the first group of UEs based on apportioning access to the APD between the first group of UEs and the second group of UEs.

Example 10: The method as recited in example 9, wherein selecting the second surface configuration based on apportioning access to the APD further comprises:

selecting the second surface configuration based on at least one of:

time-partitioned access to the APD; or panel-partitioned access to the surface of the APD.

Example 11: The method as recited in any one of examples 1 to 10, wherein transmitting the wireless signal to the multiple UEs further comprises:

transmitting broadcast information to the multiple UEs;

transmitting a multicast and broadcast services, MBS, message; or transmitting paging information.

Example 12: The method as recited in example 11, wherein transmitting the broadcast information further comprises:

transmitting one or more system information blocks, SIBs;

transmitting a multicast and broadcast services, MBS, message; or transmitting an evolved multimedia broadcast multicast services, eMBMS, message.

Example 13: The method as recited in any one of examples 1 to 12, wherein selecting the surface configuration further comprises selecting a beam-sweeping pattern that includes a set of surface configurations, and wherein directing the APD to apply the surface configuration to the surface further comprises:

directing the APD to apply each surface configuration of the set of surface configurations to the surface in succession.

Example 14: The method as recited in example 13, further comprising:

selecting a repeat time-duration; and directing the APD to repeat the beam-sweeping pattern based on the repeat time-duration.

Example 15: The method as recited in example 14, wherein selecting the repeat time-duration comprises:

selecting the repeat time-duration based on periodic downlink transmissions.

Example 16: The method as recited in example 15, wherein selecting the repeat time-duration based on the downlink transmission comprises:

selecting the repeat time-duration based on multiple system information block, SIB, transmissions.

Example 17: The method as recited in any one of examples 14 to 16, further comprising:

apportioning the repeat time-duration into multiple sub-periods; and directing the APD to apply and maintain a respective surface configuration of the set of surface configurations for a respective sub-period of the multiple sub-periods.

Example 18: The method as recited in example 17, wherein apportioning the repeat time-duration into multiple sub-periods further comprises:

sharing at least one sub-period of the multiple sub-periods to a second base station.

Example 19: An apparatus comprising:

a processor; and computer-readable storage media comprising instructions, responsive to execution by the processor, for directing the apparatus to perform a method as recited in any one of examples 1 to 18.

Example 20: Computer-readable storage media comprising instructions, responsive to execution by a processor, for directing an apparatus to perform a method as recited in any one of examples 1 to 18.

Although aspects of multi-UE-communication transmissions using APDs have been described in language specific to features and/or methods, the subject of the appended claims is not necessarily limited to the specific features or methods described. Rather, the specific features and methods are disclosed as example implementations of multi-UE-communication transmissions using APDs, and other equivalent features and methods are intended to be within the scope of the appended claims. Thus, the appended claims include a list of features that can be selected in "any combination thereof," which includes combining any number and any combination of the listed features. Further, various different aspects are described, and it is to be appreciated that each described aspect can be implemented independently or in connection with one or more other described aspects.

What is claimed is:

1. A method performed by a base station for communicating with multiple user equipments (UEs) using an adaptive phase-changing device (APD), the method comprising:

configuring a communication path to include the APD for a wireless signal used to transmit a multi-UE communication to the multiple UEs;

selecting a beam-sweeping pattern that includes a set of surface configurations, each surface configuration for a surface of the APD that transforms an incident wireless signal into a reflected wireless signal with a spatially modified beam width relative to the incident wireless signal;

directing the APD to apply each surface configuration of the set of surface configurations to the surface in succession; and transmitting the wireless signal carrying the multi-UE communication towards the surface of the APD.

2. The method as recited in claim 1, wherein selecting a surface configuration of the set of surface configurations for the surface further comprises:

receiving a unicast transmission from at least one UE of the multiple UEs using the surface of the APD and a unicast surface configuration for the surface; and selecting the surface configuration based on the unicast surface configuration.

3. The method as recited in claim 2, wherein selecting the surface configuration based on the unicast surface configuration further comprises:

identifying a first reflection angle at the APD surface when configured with the unicast surface configuration and selecting, as the surface configuration, a multi-UE-communication surface configuration that configures the APD surface with a second reflection angle that is within a threshold value of the first reflection angle; or deactivating one or more configurable surface elements used by the unicast surface configuration.

4. The method as recited in claim 1, further comprising:

selecting, as the multiple UEs, a group of UEs based on a respective UE-location of each UE in the multiple UEs.

5. The method as recited in claim 1, wherein transmitting the wireless signal carrying the multi-UE communication further comprises:

transmitting at least a first unicast transmission to a first UE of the multiple UEs and a second unicast transmission to a second UE of the multiple UEs using the wireless signal.

6. The method as recited in claim 5, wherein transmitting at least the first unicast transmission and the second unicast transmission using the wireless signal further comprises:

transmitting the first unicast transmission and the second unicast transmission using a same time slot for the first unicast transmission and the second unicast transmission, a first frequency allocation for the first unicast transmission, and a second frequency allocation for the second unicast transmission, wherein the first frequency allocation and the second frequency allocation are different.

7. The method as recited in claim 1, wherein the set of surface configurations includes a first surface configuration, the multiple UEs is a first group of UEs, and the method further comprises:

selecting a second surface configuration for a second group of UEs different from the first group of UEs based on apportioning access to the APD between the first group of UEs and the second group of UEs.

8. The method as recited in claim 7, wherein selecting the second surface configuration based on apportioning access to the APD further comprises:

selecting the second surface configuration based on at least one of:

time-partitioned access to the APD; or panel-partitioned access to the surface of the APD.

9. The method as recited in claim 1, wherein transmitting the wireless signal carrying the multi-UE communication further comprises:

transmitting broadcast information, the transmitting the broadcast information including:

transmitting one or more system information blocks, SIBs;

transmitting an evolved multimedia broadcast multicast services (eMBMS) message;

transmitting a multicast and broadcast services (MBS) message; or transmitting paging information.

10. The method as recited in claim 1, wherein:

selecting further comprises selecting, based on respective positions of the multiple UEs, a multi-UE-communication surface configuration for the surface of the APD for configuring the surface of the APD to transform the incident wireless signal; and directing further comprises directing the APD to apply the multi-UE-communication surface configuration to the surface of the APD.

11. The method as recited in claim 1, further comprising:

selecting a repeat time-duration; and directing the APD to repeat the beam-sweeping pattern based on the repeat time-duration.

12. The method as recited in claim 11, further comprising:

apportioning the repeat time-duration into multiple sub-periods; and directing the APD to apply and maintain a respective surface configuration of the set of surface configurations for a respective sub-period of the multiple sub-periods.

13. The method as recited in claim 12, wherein apportioning the repeat time-duration into multiple sub-periods further comprises:

sharing at least one sub-period of the multiple sub-periods to a second base station.

14. An apparatus comprising:

a processor; and computer-readable storage media comprising instructions, executable by the processor to direct the apparatus to:

configure a communication path to include an adaptive phase-changing device (APD) for a wireless signal used to transmit a multi-UE communication to multiple user equipments (UEs);

select a beam-sweeping pattern that includes a set of surface configurations, each surface configuration for a surface of the APD that transforms an incident wireless signal into a reflected wireless signal with a spatially modified beam width relative to the incident wireless signal;

direct the APD to apply each surface configuration of the set of surface configurations to the surface in succession; and transmit the wireless signal carrying the multi-UE communication towards the surface of the APD.

15. The apparatus of claim 14, wherein the instructions to select a surface configuration of the set of surface configurations for the surface of the APD are executable by the processor to direct the apparatus to:

receive a unicast transmission from at least one UE of the multiple UEs using the surface of the APD and a unicast surface configuration for the surface; and select the surface configuration based on the unicast surface configuration.

16. The apparatus of claim 15, wherein the instructions to select the surface configuration based on the unicast surface configuration are executable by the processor to direct the apparatus to:

identify a first reflection angle at the APD surface when configured with the unicast surface configuration and select, as the surface configuration, a multi-UE-communication surface configuration that configures the APD surface with a second reflection angle that is within a threshold value of the first reflection angle; or deactivate one or more configurable surface elements used by the unicast surface configuration.

17. The apparatus of claim 14, wherein the instructions are further executable by the processor to direct the apparatus to:

select, as the multiple UEs, a group of UEs based on a respective UE-location of each UE in the multiple UEs.

18. The apparatus of claim 14, wherein the instructions to transmit the wireless signal carrying the multi-UE communication are executable by the processor to direct the apparatus to:

transmit at least a first unicast transmission to a first UE of the multiple UEs and a second unicast transmission to a second UE of the multiple UEs using the wireless signal.

19. The apparatus of claim 18, wherein the instructions to transmit at least the first unicast transmission and the second unicast transmission using the wireless signal are executable by the processor to direct the apparatus to:

transmit the first unicast transmission and the second unicast transmission using a same time slot for the first unicast transmission and the second unicast transmission, a first frequency allocation for the first unicast transmission, and a second frequency allocation for the second unicast transmission, wherein the first frequency allocation and the second frequency allocation are different.

20. The apparatus of claim 14, wherein the set of surface configurations includes a first surface configuration, the multiple UEs is a first group of UEs, and the instructions are further executable by the processor to direct the apparatus to:

select a second surface configuration for a second group of UEs different from the first group of UEs based on apportioning access to the APD between the first group of UEs and the second group of UEs.

* * * * *